US012461264B1

(12) United States Patent
Mahmoud

(10) Patent No.: US 12,461,264 B1
(45) Date of Patent: Nov. 4, 2025

(54) SYSTEM AND METHOD FOR ENHANCING SEISMIC DATA RESOLUTION BY TRANSFORMING LOW-FREQUENCY SEISMIC DATA TO HIGH-FREQUENCY SEISMIC DATA

(71) Applicant: KING FAHD UNIVERSITY OF PETROLEUM AND MINERALS, Dhahran (SA)

(72) Inventor: Sherif Mohamed Hanafy Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/182,499

(22) Filed: Apr. 17, 2025

(51) Int. Cl.
*G01V 1/34* (2006.01)
*G01V 1/36* (2006.01)

(52) U.S. Cl.
CPC ................... *G01V 1/345* (2013.01)

(58) Field of Classification Search
CPC ............. G01V 1/345; G01V 1/34; G01V 1/36
USPC ......................................................... 702/16
See application file for complete search history.

(56) References Cited

U.S. PATENT DOCUMENTS

| | | |
|---|---|---|
| 2016/0341836 A1 | 11/2016 | Poole |
| 2020/0393588 A1 | 12/2020 | Bai et al. |
| 2022/0196866 A1* | 6/2022 | Bakulin .................. G01V 1/362 |
| 2023/0140656 A1* | 5/2023 | Hegge ....................... G01V 1/34 |
| | | 702/14 |
| 2023/0213670 A1 | 7/2023 | Luo et al. |

FOREIGN PATENT DOCUMENTS

| | | | | |
|---|---|---|---|---|
| CN | 111766624 B | | 10/2021 | |
| FR | 2991463 A1 * | | 12/2013 | ............... G01V 1/28 |

OTHER PUBLICATIONS

English translation of FR-2991463, Dec. 6, 2013. (Year: 2013).*
Yuanyuan Li, et al., "Extended full waveform inversion with matching filter", Geophysical Prospecting, vol. 69, Issue 7, Jun. 1, 2021, pp. 1441-1454, 8 pages.

* cited by examiner

*Primary Examiner* — Michael P Nghiem
(74) *Attorney, Agent, or Firm* — Oblon, McClelland, Maier & Neustadt, L.L.P.

(57) ABSTRACT

A system and method for generating synthetic high-frequency seismic data for subsurface imaging comprises injecting a first seismic shot having a low frequency into a surface region and receiving reflected waves at a plurality of seismic receivers. Seismic traces are recorded and processed to generate a low-frequency seismic shot gather. A second seismic shot having a high frequency is injected, and a sparse number of high-frequency traces are recorded. A computing device resamples the low-frequency traces to match the sparse high-frequency dataset and applies a one-dimensional (1D) local matching filter to transform the low-frequency traces into simulated high-frequency traces. The transformed dataset is used to generate a high-resolution subsurface image of geological interfaces. The system enables computationally efficient high-frequency seismic data synthesis, optimizing seismic inversion accuracy while reducing acquisition costs and computational overhead.

20 Claims, 11 Drawing Sheets

SYSTEM AND METHOD FOR ENHANCING SEISMIC DATA RESOLUTION BY TRANSFORMING LOW-FREQUENCY SEISMIC DATA TO HIGH-FREQUENCY SEISMIC DATA

CROSS-REFERENCE TO RELATED APPLICATION

The present disclosure claims the benefit of Saudi Patent Application No. 1020252464, filed Apr. 16, 2025 with the Saudi Authority for Intellectual Property Office, which is incorporated herein by reference in its entirety.

BACKGROUND

Technical Field

The present disclosure is directed to an enhanced seismic data processing method for transforming low-frequency seismic data into high-frequency seismic data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A seismic survey is a geophysical method used to image subsurface structures by generating seismic waves and recording reflections and refractions of the seismic waves using a network of seismic receivers. In geophysical exploration, the acquired and processed seismic data facilitates the identification of subsurface geological structures for applications such as hydrocarbon exploration, geohazard assessment, and structural imaging. The resolution and accuracy of seismic imaging are significantly influenced by the frequency content of the acquired seismic data. High-frequency seismic data contribute to improved spatial resolution, allowing for detailed imaging of geological formations. However, the acquisition of high-frequency seismic data is often constrained by attenuation effects, source limitations, and noise interference, specifically in shallow subsurface regions.

Conventional processes for seismic data acquisition involve the generation of seismic waves using controlled sources, such as vibroseis trucks, dynamite charges, or air guns, and the recording of reflected or refracted signals using an array of seismic receivers. The acquired seismic data often exhibit a trade-off between frequency content and computational efficiency. Low-frequency seismic waves penetrate deeper into the subsurface but lack the resolution required for precise imaging of fine-scale geological features. High-frequency seismic waves provide enhanced resolution but are more susceptible to energy loss and scattering, particularly in complex geological environments.

Several approaches have been developed to address the limitations associated with high-frequency seismic data acquisition. Full waveform inversion (FWI) has been developed to iteratively refine subsurface velocity models using seismic data acquired at various frequencies. However, the computational cost of FWI increases significantly with the frequency of the input data, limiting its feasibility for large-scale seismic surveys. Another approach involves the use of spectral extrapolation techniques to reconstruct high-frequency components from available low-frequency seismic data. However, the approach is prone to errors. The aforementioned approaches rely on statistical models or machine learning algorithms to predict missing high-frequency content, but their accuracy is often constrained by the quality of the input data and the underlying assumptions of the extrapolation model.

US Patent Publication No. US20160341836A1 describes a computing device and a technique for processing seismic data associated with a surveyed subsurface. The technique includes receiving at least first and second seismic data sets recorded with different spatial sampling and temporal bandwidths, using the first seismic data to guide the processing of the second seismic data, and generating an image of the subsurface based on processed second seismic data. The reference further discloses that a first seismic source may generate high-frequency signals while a second seismic source may generate low-frequency signals. However, this reference does not mention generating simulated high-frequency signals from the low-frequency signals by converting the low-frequency signals to synthetic high-frequency signals using adaptive filtering.

US Patent Publication No. US20230213670A1 describes a method and apparatus for locating subsurface geohazards based on seismic data processing. The method includes receiving seismic trace signals in a geographical area based on a shot gather, isolating and stacking the seismic trace signals to generate a windowed trace signal, transforming the windowed trace signal into the frequency domain, and calculating a low-frequency-to-high-frequency ratio for the transformed trace signal. The traces are subjected to Fourier transformation. Results of transformation are utilized to generate a surface map indicating relative probabilities of subsurface geohazards. The reference relies on the low-frequency-to-high-frequency ratio for the transformed trace signal, and does not generate synthetic high frequency traces from low frequency traces.

Conventional techniques for seismic data processing remain constrained by the trade-off between resolution and computational complexity. Existing seismic data processing techniques exhibit several limitations with respect to the transformation of low-frequency seismic data into high-frequency seismic data. Notably, the conventional methodologies focus on attenuation compensation, spectral extrapolation, and inversion techniques, which fail to generate synthetic high-frequency traces from low-frequency seismic data with the required accuracy and computational efficiency. Thus, each of the aforementioned references suffers from one or more deficiencies that limit their applicability in transforming low-frequency seismic data into high-frequency seismic data.

Accordingly, there remains a need for a method and system for enhancing seismic data resolution by transforming low-frequency seismic data into high-frequency seismic data. The present disclosure addresses these limitations by implementing a structured approach to seismic data processing that incorporates resampling, data integration, and adaptive filtering to generate high-resolution seismic images with reduced computational overhead.

SUMMARY

In an exemplary embodiment, a method for generating synthetic high-frequency seismic data is described. The method comprises injecting, by a seismic source, a first seismic shot having a low frequency into a surface region under investigation, receiving, by a plurality of seismic receivers, a plurality of waves reflected from geological interfaces below the surface region due to the first seismic shot, and generating, by each of the plurality of seismic receivers, seismic traces from the reflected waves due to the first seismic shot, recording, by a recorder operatively connected to each of the plurality of seismic receivers, the seismic traces of the first seismic shot, injecting, by the seismic source, a second seismic shot having a high frequency into the surface region under investigation, receiving, by the plurality of seismic receivers, a sparse number of the reflected waves due to the second seismic shot, generating, by each of the plurality of seismic receivers, a sparse number of seismic traces from the sparse number of reflected waves due to the second seismic shot, and recording, by the recorder, the sparse number of seismic traces of the second seismic shot, receiving, by a computing device operably connected to the recorder, wherein the computing device includes a communications unit, electrical circuitry, a memory having program instructions and at least one processor configured to execute the program instructions, the seismic traces of the first seismic shot and the sparse number of seismic traces of the second seismic shot, combining, by the computing device, the seismic traces of the reflected waves due to the first seismic shot into a low frequency seismic shot gather, and combining, by the computing device, the sparse number of seismic traces of the second seismic shot into a sparse high frequency common receiver gather, generating, by the computing device, a sparse low frequency common receiver gather by resampling the low frequency common receiver gather to match a number of samples per seismic trace of the low frequency common receiver gather to a number of samples per seismic trace of the sparse high frequency common receiver gather, calculating, by the computing device, a 1D local matching filter, generating, by the computing device, a dataset of simulated high frequency traces by converting the traces of the sparse low frequency common receiver gather into high frequency traces by applying the 1D local matching filter to the traces of the sparse low frequency common receiver gather, and generating, by the computing device, a high-resolution subsurface image of the geological interfaces below the surface region from the dataset of simulated high frequency traces.

In another exemplary embodiment, a system for generating a high-resolution subsurface image of geological interfaces below a surface region from simulated high frequency traces is described. The system comprises a seismic source located on the surface region, where the seismic source is configured to inject one or more of a low frequency seismic shot and a high frequency seismic shot into a subsurface region below the surface region, a plurality of seismic receivers located on the surface region, where the plurality of seismic receivers are configured to generate seismic traces from waves reflected from the geological interfaces, at least one recorder connected to the plurality of seismic receivers, where the at least one recorder is configured to receive and store a full number of the seismic traces generated from the reflected waves due to the low frequency seismic shot and a sparse number of the seismic traces generated from the reflected waves due to the high frequency seismic shot, and a computing device operably connected to the recorder, where the computing device includes a communications unit, electrical circuitry, a memory having program instructions and at least one processor configured to execute the program instructions, combine the seismic traces of the reflected waves due to the first seismic shot into a low frequency seismic shot gather, combine the sparse number of seismic traces of the second seismic shot into a sparse high frequency common receiver gather, generate a sparse low frequency common receiver gather by resampling the low frequency common receiver gather to match a number of samples per seismic trace of the low frequency common receiver gather to a number of samples per seismic trace of the sparse high frequency common receiver gather, calculate a 1D local matching filter, generate a dataset of simulated high frequency traces by a conversion of the traces of the sparse low frequency common receiver gather into high frequency traces by an application of the 1D local matching filter to the traces of the sparse low frequency common receiver gather, and generate a high-resolution subsurface image of the geological interfaces below the surface region from the dataset of simulated high frequency traces.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
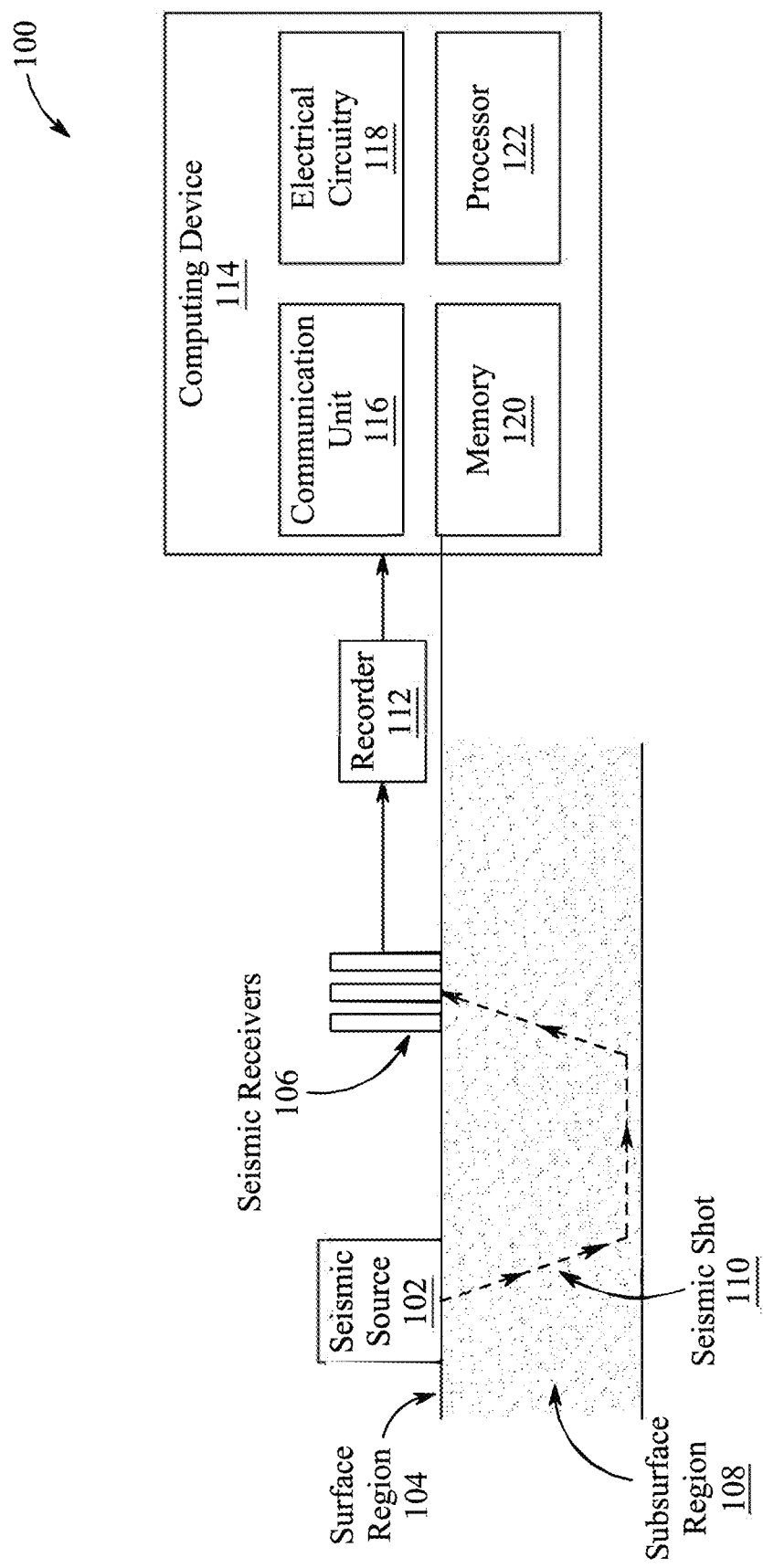
FIG. 1A is a schematic diagram of a seismic data acquisition and processing system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about," and similar terms generally refer to ranges that include the identified value within a margin of 20%, 10%, or preferably 5%, and any values therebetween.

Aspects of this disclosure are directed to improving seismic imaging resolution by generating synthetic high-frequency seismic data. Conventional seismic surveys often face limitations in acquiring high-frequency seismic traces due to cost, data sparsity, and acquisition constraints, resulting in reduced resolution of subsurface features. The present disclosure describes a system and a method which address aforementioned issues faced by the conventional seismic surveys by computationally transforming low-frequency seismic traces into high-frequency traces using a one-dimensional (1D) local matching filter. By applying this technique, the system and the method enhance subsurface imaging without requiring extensive high-frequency data acquisition, thereby improving resolution while reducing survey costs and computational.

FIG. 1A illustrates a seismic data acquisition and processing system 100. The seismic data acquisition and processing system, also referred to as the system 100, is configured to generate a high-resolution subsurface image of geological interfaces below a surface region. The system 100 implements a seismic survey architecture for enhanced seismic data processing, where low-frequency seismic traces are computationally transformed into high-frequency traces to improve subsurface imaging resolution. A seismic trace is a recorded waveform of seismic waves as the waves travel through the subsurface and reflect from different geological layers. The reflected waves are received at each one of the seismic receivers 106. The low-frequency seismic traces correspond to seismic waves with lower frequencies, typically ranging from 1 Hz to 20 Hz. The low-frequency seismic traces are characterized by longer wavelengths and deeper wave penetration, making them resourceful for imaging deep geological structures. The high-frequency seismic traces correspond to seismic waves with higher frequencies, in the range of 20 Hz to 100 Hz or higher. The high-frequency seismic traces have shorter wavelengths, which are useful in capturing fine-scale geological details and improving subsurface resolution. The high-frequency traces are used in near-surface imaging applications, fault detection, and stratigraphic interpretation.

The seismic surveys can be conducted on land or in marine environments, with data acquisition strategies ranging from 2D surveys, which provide cross-sectional views of subsurface structures, to 3D surveys, which offer volumetric imaging with higher resolution. The effectiveness of a seismic survey may depend on factors such as seismic source characteristics, receiver density, survey layout, data processing techniques, and the like.

The system 100 can be implemented in various geophysical applications, including hydrocarbon exploration, geotechnical investigations, geohazard assessment, and subsurface structural analysis.

The system 100 comprises a seismic source(s) 102 positioned on a surface region 104. The seismic source(s) 102 is configured to inject one or more of a low-frequency seismic shots in a first time period and one or more high-frequency seismic shots in a second time period. For the sake of simplicity, a single seismic shot, referred to as 110, is shown as injected into a subsurface region 108 underlying the surface region 104. A seismic shot refers to a controlled release of seismic energy into the subsurface using a seismic source, such as a vibroseis truck, air gun, or explosives. When the seismic shot travels through the earth and is detected by seismic receivers 106, a seismic trace is generated by each receiver. The low-frequency seismic shot 110 is indicative of the generated seismic waves have lower frequencies, which penetrate deeper into the subsurface. The high-frequency seismic shot is indicative of the generated seismic waves that include higher frequencies. High frequency waves penetrate less deeply than low frequency waves, but provide better resolution.

The seismic source 102 is implemented, for example, using a plurality of seismic energy generation mechanisms, including, but not limited to, vibroseis trucks, weight drop mechanisms, air guns, and controlled explosive charges. For example, in land-based seismic surveys, the vibroseis truck may generate controlled low-frequency seismic waves. In applications requiring greater wave penetration, explosive charges may be detonated to create high-energy seismic shots. In some examples, the vibroseis truck generates a seismic sweep ranging from a few Hz to several hundred Hz, with a sweep length of approximately 10 seconds. The energy penetration depth for vibroseis sources may extend a few kilometers from the ground surface. In comparison, weight drop sources generate lower energy signals, with a frequency range of 10 Hz to 100 Hz and a penetration depth of approximately 800 to 1200 meters. The seismic sources 102 may be arranged in a 2D or 3D layout. In an example, the 2D layout arrangement includes sources placed along a linear profile, whereas a 3D layout arrangement includes of sources distributed across multiple parallel profiles. In examples, source interval may be equal to, double the receiver interval or defined based on the survey objectives.

The system 100 includes a plurality of seismic receivers 106 placed across the surface region 104 at, for example, predetermined spatial intervals. The seismic receivers 106 are configured to receive the plurality of waves reflected from geological interfaces below the surface region due to a first seismic shot 110. The seismic receivers 106 then convert the received waveforms into electrical signals representative of seismic traces. In one example, the density of the plurality of seismic receivers 106 is in a range of about three seismic receivers per meter squared to about three seismic receivers per 25 meters squared.

In a ground seismic survey, a defined number of seismic receivers 106 are configured to record seismic signals reflected from subsurface geological structures. The number of seismic receivers 106 used in a survey is based on a survey design, objective, survey area and a required imaging resolution. High-resolution 3D seismic surveys may require a significantly greater number of seismic receivers 106 compared to 2D seismic surveys, enhancing spatial resolution and providing more detailed subsurface images. The channel count of the seismic system, which refers to the number of seismic receivers 106 used, directly impacts the quality of the acquired seismic data. To capture an accurate representation of the subsurface, multiple seismic receivers 106 are strategically positioned along a survey line or grid, recording data from a single seismic source at varying offsets.

The seismic receivers 106 may be implemented as geophones, accelerometers, or broadband seismometers. Geophones are used in land-based seismic surveys due to their sensitivity to ground motion. Broadband seismometers are utilized for extended frequency range detection. The spatial configuration of the seismic receivers 106 may be adapted based on the survey objectives, with linear, grid-based, or random receiver arrays being utilized to optimize data acquisition for enhanced imaging resolution. In 2D seismic surveys, the seismic receivers 106 are deployed along a single linear profile with receiver intervals ranging from, for example, 1 m to 5 m for shallow applications and from 12.5 m to 50 m for deep applications. In 3D seismic surveys, the receivers are distributed along parallel profiles, with in-line receiver intervals of, for example, 12.5 m to 50 m and cross-line offsets of 50 m to 100 m. The total number of receivers may range from a few hundred to tens of thousands, based on the resolution requirements and survey scale.

The system 100 includes a recorder 112 operably connected to the seismic receivers 106. The recorder 112 is configured to receive and store seismic traces generated from the reflected waves of the low-frequency seismic shot 110 and the high-frequency seismic shot 110. The recorder 112 may be implemented as a standalone seismic data acquisition unit or an integrated component within a mobile survey system. In some aspects, the recorder 112 includes an onboard storage media, and/or one or more digital signal processors for preliminary noise filtering, and real-time data transmission capabilities. The seismic traces recorded by the recorder 112 may be stored in raw format for detailed post-processing or in processed format with preliminary enhancements for real-time analysis. The recorder 112 provides a time stamp to the seismic traces received within a time window.

The system 100 further comprises a computing device 114 operably connected to the recorder 112. The computing device 114 is implemented for processing seismic data to transform low-frequency traces into high-frequency traces and generate a high-resolution subsurface image. The computing device 114 is configured to execute one or more computational operations, including seismic trace resampling, one-dimensional (1D) local matching filter calculations, and synthetic high-frequency trace generation, which collectively enhance seismic imaging resolution.

The computing device 114 includes a communications unit 116, electrical circuitry 118, and a memory 120 having program instructions executable by at least one processor 122. The communications unit 116 facilitates data exchange between the computing device 114 and external systems, enabling real-time data transmission and remote processing. The electrical circuitry 118 encompasses digital signal processors (DSPs), application-specific integrated circuits (ASICs), and other hardware accelerators that optimize computational efficiency. The memory 120 includes a combination of volatile and non-volatile storage, such as random access memory (RAM) for temporary data processing and solid-state drives (SSDs) for long-term data retention.

The computing device 114 includes one or more processors configured to control the operations and functionality of the system 100, as well as to facilitate communications between various components. The one or more processors may include any suitable processing circuitry, such as a central processing unit (CPU), graphics processing unit (GPU), microprocessor, digital signal processor (DSP), or any combination thereof. In certain aspects, the computing device 114 utilizes hardware logic components such as field-programmable gate arrays (FPGAs), application-specific integrated circuits (ASICs), application-specific standard products (ASSPs), system-on-chip (SoC) architectures, and complex programmable logic devices (CPLDs), which enable high-speed parallel processing of seismic data. Each processor may incorporate a local memory module, which is configured to store program systems, processing data, and one or more operating systems, thereby optimizing computational performance.

The memory 120 of the computing device 114 comprises one or more types of storage mediums, which may include volatile or non-volatile memory, removable or non-removable storage, and distributed computing storage architectures. In various exemplary implementations, the memory 120 may store computer-readable instructions, data structures, and program systems for executing seismic data processing tasks. The memory 120 may include hard drives, solid-state drives (SSDs), flash memory, read-only memory (ROM), electronically erasable programmable read-only memory (EEPROM), magnetic storage devices, optical storage mediums, and computer-readable storage media (CRSM) that facilitate high-speed access to seismic datasets and program instructions. The memory 120 may be configured as a distributed storage system, where seismic data is partitioned and stored across multiple networked storage servers, enhancing data redundancy and accessibility. The computing device 114 may also interface with external databases, which may include, for example, NoSQL, MySQL, and SQL Server architectures, for efficient data retrieval and processing.

The communications unit 116 of the computing device 114 includes any circuitry necessary for enabling real-time data transmission and external communications. The computing device 114 is operable to communicate with additional devices, servers, and systems, including information systems, remote control devices, field seismic sources, seismic receivers, and resource extraction equipment. The computing device 114 is configured to transmit and receive seismic data over wired and wireless networks, where the communications interface supports multiple network protocols.

The computing device 114 is capable of transmitting seismic data over a network infrastructure using protocols such as Transfer Control Protocol/Internet Protocol (TCP/IP), including Hypertext Transfer Protocol (HTTP), Secure Shell (SSH), and WebRTC. The computing device 114 is further operable to establish wireless network connections through communication standards such as Wi-Fi (IEEE 802.11), Bluetooth, ZigBee, and satellite communications. The computing device 114 may include communications hardware and software to facilitate connectivity with remote monitoring and data processing centers, where a communications chipset may be implemented, such as a GSM chipset, CDMA chipset, LTE/5G chipset, Wi-Fi chipset, or Bluetooth chipset. In exemplary implementations, the computing device 114 supports wired connections, including Ethernet, fiber-optic interfaces, digital subscriber line (DSL), and coaxial cable networks. In some examples, the computing device 114 may include encryption modules to secure seismic data transmissions, ensuring the integrity of acquired seismic datasets.

The computing device 114 executes computational operations to enhance seismic data resolution. The recorder 112 receives seismic data from the seismic receivers 106, and the computing device 114 receives the seismic data from the recorder 112. Upon receiving seismic data from the recorder 112, the computing device 114 combines the seismic traces of the reflected waves due to the first seismic shot 110 into a low-frequency seismic shot gather. The computing device 114 further combines the sparse number of seismic traces of the second seismic shot into a sparse high-frequency common receiver gather. The sparse high-frequency common receiver gather (HF-CRG) refers to a seismic data set where seismic traces from a single receiver location are compiled for multiple seismic shots, specifically capturing high-frequency seismic waves. To facilitate frequency alignment, the computing device 114 generates a sparse low-frequency common receiver gather by resampling the low-frequency common receiver gather to match the number of samples per seismic trace of the sparse high-frequency common receiver gather. The low-frequency common receiver gather (LF-CRG) includes seismic traces recorded at a single receiver location but obtained from low-frequency seismic waves across multiple shots.

Process of resampling a common receiver gather comprises adjusting the sampling rate of seismic traces recorded from a single seismic source. The resampling process modifies the time intervals between data points to achieve a desired time resolution while maintaining the spatial information within the gather. By aligning the sampling rate of low-frequency seismic traces with the dominant frequencies present in the dataset, the computing device 114 reduces noise and enhances the clarity of the seismic signals. The resampling process is performed so that seismic traces exhibit consistent time intervals, facilitating the accurate application of processing algorithms such as normal moveout (NMO) correction, migration, and stacking.

The resampling process includes steps of interpolation when upsampling, where new data points from the seismic traces are estimated and inserted between existing samples based on surrounding data, thereby increasing the sampling rate to enhance resolution. Conversely, in cases where downsampling is required, the resampling process utilizes decimation, where a subset of the data points is selected while applying appropriate filtering to prevent aliasing artifacts. To maintain data integrity, filtering techniques are implemented to mitigate artifacts introduced by interpolation or decimation. The resampling process improves data quality to a certain extent, and the effectiveness depends on the original signal quality.

Following the resampling step, the computing device 114 calculates a one-dimensional (1D) local matching filter. The 1D local matching filter is subsequently applied to all low-frequency traces to generate a dataset of simulated high-frequency traces, effectively transforming low-frequency seismic data into high-frequency data while preserving amplitude and phase characteristics. The computing device 114 identifies a dataset including one or more of a thin layer, a local anomaly, a fault, a fracture, and a cavity in the geological interfaces below the surface region from the high-resolution subsurface image generated from the dataset of simulated high frequency traces. The computing device 114 processes the dataset to generate an image output. The image output is characterized by enhanced structural clarity, facilitating the identification of fine-scale geological features such as stratigraphic layers, faults, fractures, and subsurface fluid reservoirs.

In examples, the system 100 may integrate distributed system and/or cloud-based computing resources for large-scale seismic data processing, where the computing device 114 interfaces with remote data centers to execute computationally intensive seismic imaging algorithms. The system 100 may incorporate machine learning algorithms for adaptive seismic data filtering, noise attenuation, and feature classification, enabling automated interpretation of subsurface structures.

The computing device 114 is configured to execute advanced seismic processing techniques, including machine learning algorithms for seismic data filtering, noise attenuation, and automated subsurface feature classification. In an exemplary implementation, the computing device 114 utilizes a neural network-based seismic inversion model to enhance subsurface imaging resolution. In implementations, the computing device 114 executes full waveform inversion (FWI) algorithms to reconstruct velocity models of the subsurface with improved accuracy. The FWI is a seismic imaging technique that utilizes seismic waves to create detailed models of the subsurface. The FWI is a nonlinear, iterative process that compares observed seismic data with simulated data to update a velocity model, thereby improving the accuracy of subsurface imaging.

The FWI operates by utilizing the entire seismic wavefield, including both reflected and refracted body waves, to refine the velocity model of subsurface of the Earth. The FWI process begins by comparing the observed seismic data, which is recorded from field measurements, with simulated data generated using an initial velocity model. The differences between the observed and simulated data are then used to iteratively update the velocity model, ensuring that the simulated data more closely aligns with the recorded observations. The iterative process continues until the velocity model accurately represents the subsurface structure.

The FWI is useful in seismic imaging and reservoir characterization for generation of high-resolution subsurface models. The detailed models are critical for applications such as hydrocarbon exploration, geotechnical investigations, and earthquake studies, where understanding the structural properties of the interior of the Earth is required at least for various industrial applications. In an exemplary application, the computing device 114 may be deployed in a seismic survey where a vibroseis truck serves as the seismic source 102. The vibroseis truck generates a controlled low-frequency seismic shot, and seismic receivers 106 detect the reflected waveforms. A subset of high-frequency seismic shots are injected at predetermined locations to capture sparse high-frequency traces. The recorded data is processed by the computing device 114 to generate a high-resolution subsurface image, which is used for analyzing geological formations with enhanced precision. The computing device 114 may also be employed in real-time seismic monitoring applications, where continuous seismic data acquisition and processing facilitate early warning systems for earthquake-prone regions and industrial seismic monitoring.

The system 100 is applicable across a diverse range of geological environments, including sedimentary basins, crystalline terrains, and fault-prone regions. In hydrocarbon exploration, the system 100 can be applied for generating enhanced imaging of reservoir structures, thereby improving drilling accuracy and resource estimation. In geotechnical investigations, the system 100 is employed to assess subsurface stability, aiding in infrastructure development and earthquake hazard assessment. The system 100 may be utilized in geohazard monitoring, where real-time seismic imaging provides early detection of subsurface anomalies such as landslides, sinkholes, and fluid migration pathways.

In operation, a method is implemented by the system 100 for generating synthetic high-frequency seismic data. The method comprises injecting, by a seismic source 102, a first seismic shot having a low frequency into a surface region 104 under investigation. The method further includes receiving, by a plurality of seismic receivers 106, a plurality of waves reflected from geological interfaces below the surface region 104 due to the first seismic shot. Each of the plurality of seismic receivers 106 is configured for generating seismic traces from the reflected waves due to the first seismic shot, and a recorder 112 operatively connected to each of the plurality of seismic receivers 106 is configured for recording the seismic traces of the first seismic shot.

Following the recording of the first seismic shot, the method further comprises injecting, by the seismic source 102, a second seismic shot having a high frequency into the surface region 104 under investigation. The method also includes receiving, by the plurality of seismic receivers 106, a sparse number of the reflected waves due to the second seismic shot. Each of the plurality of seismic receivers 106 is further configured for generating a sparse number of seismic traces from the sparse number of reflected waves due to the second seismic shot, and the recorder 112 is further configured for recording the sparse number of seismic traces of the second seismic shot.

The method further includes receiving, by a computing device 114 operably connected to the recorder 112, the seismic traces of the first seismic shot and the sparse number of seismic traces of the second seismic shot. The computing device 114 includes a communications unit 116, electrical circuitry 118, a memory 120 having program instructions, and at least one processor configured to execute the program instructions.

The method further comprises combining, by the computing device 114, the seismic traces of the reflected waves due to the first seismic shot into a low-frequency seismic shot gather, and combining, by the computing device 114, the sparse number of seismic traces of the second seismic shot into a sparse high-frequency common receiver gather. The method also includes generating, by the computing device 114, a sparse low-frequency common receiver gather by resampling the low-frequency common receiver gather to match a number of samples per seismic trace of the low-frequency common receiver gather to a number of samples per seismic trace of the sparse high-frequency common receiver gather.

The method further includes calculating, by the computing device 114, a one-dimensional (1D) local matching filter, and generating, by the computing device 114, a dataset of simulated high-frequency traces by converting the traces of the sparse low-frequency common receiver gather into high-frequency traces by applying the 1D local matching filter to the traces of the sparse low-frequency common receiver gather.

The method further comprises generating, by the computing device 114, a high-resolution subsurface image of the geological interfaces below the surface region 104 from the dataset of simulated high-frequency traces.

Figure 1B:
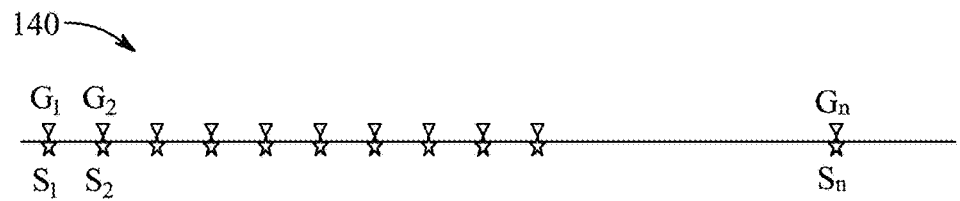
FIG. 1B is a schematic illustration of a seismic data acquisition configuration for a two-dimensional (2D) seismic survey profile, according to certain embodiments.

FIG. 1B illustrates a seismic data acquisition configuration 140 for a two-dimensional (2D) seismic survey profile, where a plurality of seismic receivers ($G_1$, $G_2$) and seismic sources are implemented along a linear survey profile. $G_1$ corresponds to the first receiver, $G_2$ corresponds to the second receiver, and $G_n$ represents an nth receiver within the profile, where n<100,000. The seismic source ($S_1$, $S_2$) is strategically positioned at predetermined spatial intervals. $S_1$ represents the first seismic shot, $S_2$ represents the second seismic shot, and $S_n$ denotes the nth seismic shot along the profile.

During seismic data acquisition, each of the seismic receivers ($G_1$, $G_2$) is operably connected to a recording system. The seismic survey process commences with the placement of a seismic source at $S_1$, whereupon a controlled seismic energy pulse is generated and propagated into the subsurface. The resulting seismic wave reflections are subsequently detected by each of the seismic receivers ($G_1$, $G_2$), thereby generating a common shot gather (CSG) corresponding to shot position $S_1$. The CSG is a seismic data acquisition and processing technique where seismic traces recorded by multiple receivers from a single seismic shot are compiled together. The seismic source is then repositioned to $S_2$, and an analogous process is executed, yielding a second common shot gather (CSG-2). This process is iterative and continues until seismic data corresponding to all predefined shot positions along the survey profile is acquired.

Figure 1C:
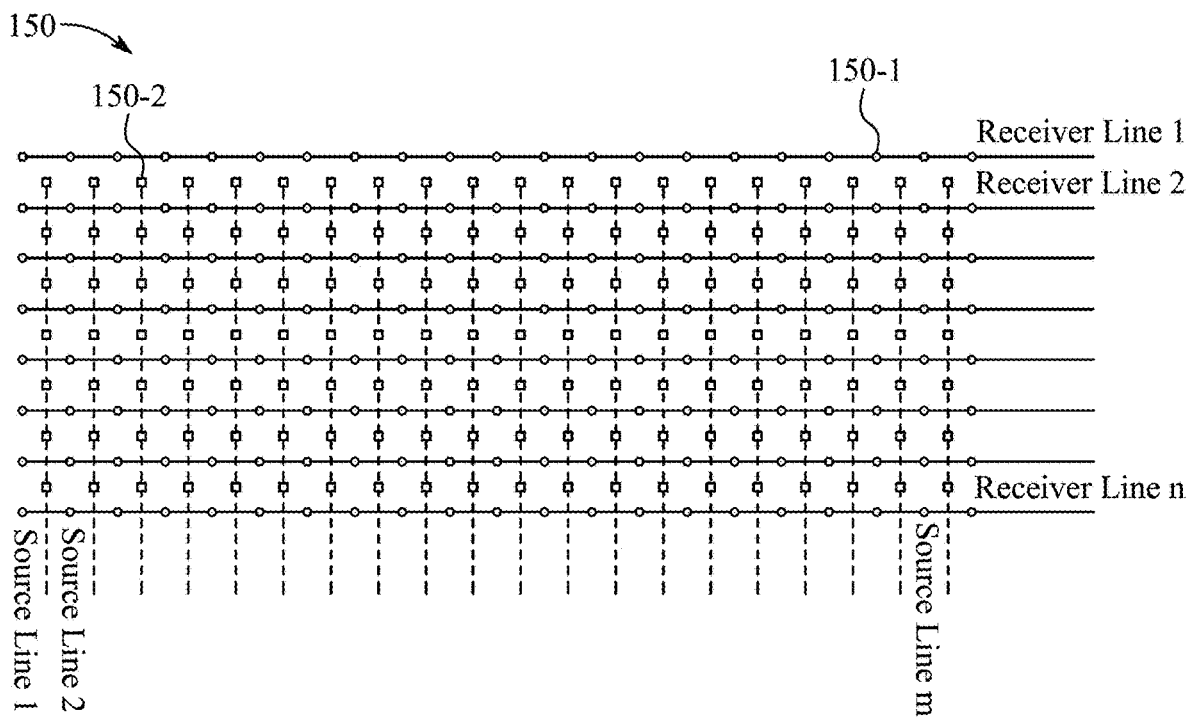
FIG. 1C is a schematic diagram of a three-dimensional (3D) seismic survey layout, according to certain embodiments.

FIG. 1C illustrates a three-dimensional (3D) seismic survey layout 150, depicting the arrangement of seismic sources and receivers across a designated survey area. The 3D seismic survey layout 150 comprises a plurality of receiver lines and a plurality of source lines systematically distributed to facilitate high-resolution subsurface imaging. A plurality of seismic receivers 1501-1 is positioned along a plurality of receiver lines, where each receiver line extends in a first direction. The plurality of seismic sources 150-2 is positioned along a plurality of source lines, where each source line extends in a second direction perpendicular to the receiver lines. In an exemplary implementation, the plurality of seismic receivers 150-1 is deployed along parallel profiles, where the in-line offset, defined as the spatial separation between adjacent receivers along a single receiver line, ranges from, for example, approximately 12.5 meters to 50 meters. The crossline offset, defined as the spatial separation between adjacent receiver lines, ranges from, for example, approximately 50 meters to 100 meters. The seismic data acquired from the 3D seismic survey layout 150 is utilized to generate a high-resolution 3D subsurface model, facilitating geophysical analysis, hydrocarbon exploration, and geological hazard assessments.

In a 3D geological seismic survey, the density of seismic receivers refers to the number of geophones deployed per unit area, typically quantified in terms of traces per square kilometer or traces per square mile. A higher density of seismic receivers results in a more detailed subsurface image by capturing an increased number of data points across the survey area. High-density 3D seismic surveys may incorporate hundreds of thousands of traces per square kilometer, whereas standard surveys may contain only tens of thousands.

A higher density of seismic receivers directly contributes to improved spatial resolution in the final seismic image, thereby facilitating more precise interpretation of geological features. Several factors influence the selection of receiver density, including the desired level of detail in the survey, the complexity of the target geological formations, the characteristics of the terrain, and budgetary constraints associated with the survey. These considerations collectively determine the optimal receiver configuration necessary to achieve high-resolution subsurface imaging.

Figure 1D:
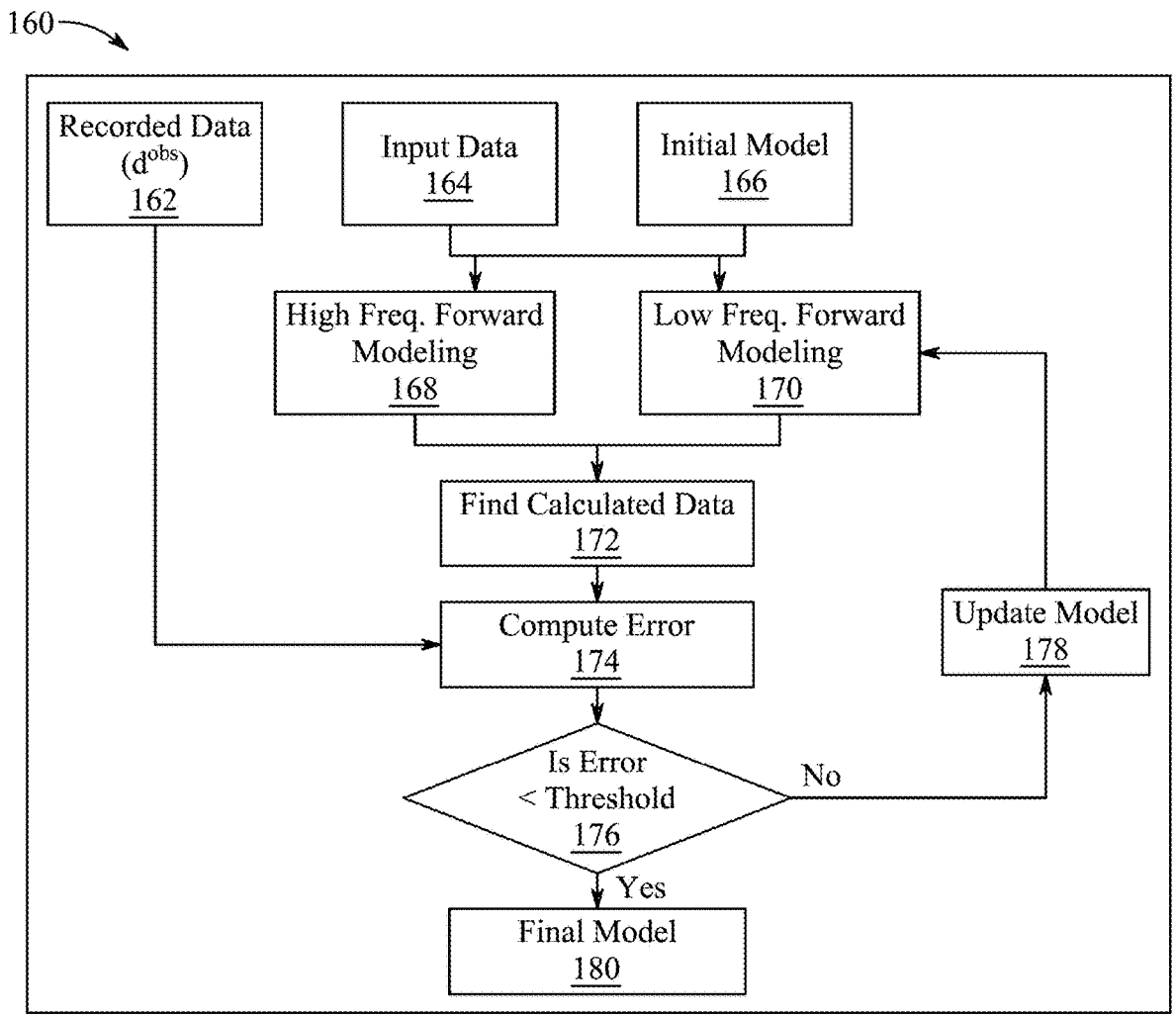
FIG. 1D is a flowchart illustrating a full-waveform inversion (FWI) process, according to certain embodiments.

FIG. 1D illustrates a FWI flowchart 160, which represents a computational framework for seismic data processing for deriving high-frequency seismic data. The flowchart details an iterative process where an input data set 164 and an initial model 166 serve as the starting parameters for the inversion procedure.

The recorded data 162, representing field-acquired seismic traces, is subjected to both high-frequency forward modeling 168 and low-frequency forward modeling 170 to generate respective synthetic seismic responses. At block 172, the calculated data $d^{cal}$ is determined, which is then compared against the recorded data to compute the error metric at block 174. The error computation process involves summing the residuals between observed and calculated seismic data.

The computed error is evaluated against a predefined threshold criterion at block 176. If the computed error does not meet the threshold, an update model 178 is generated and reintegrated into the iterative inversion framework. This iterative refinement continues until the error falls below the threshold, at which point the final subsurface velocity model 180 is produced.

The computational efficiency of the present disclosure significantly reduces the time and money required for seismic inversion. For instance, the total computation time for one iteration using the present disclosure is 2.22 days, while conventional methods require 5.43 days per iteration, leading to a 59 percent reduction in computational time. The efficiency gains are even more pronounced when scaled across 20 iterations, where the total computation time using the present disclosure is 44.4 days, compared to 108.6 days using conventional techniques.

Figure 1E:
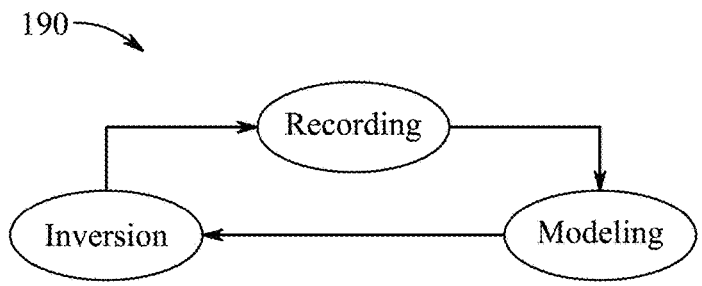
FIG. 1E is a schematic representation of a seismic data processing workflow, according to certain embodiments.

FIG. 1E illustrates a flow representation of the seismic data processing workflow 190, comprising three iterative stages, recording, modeling, and inversion. The recording stage includes recording seismic data using field-deployed seismic sources and receivers and capturing wavefield information from the subsurface. The recorded data is then used in the modeling stage, where forward modeling is executed based on the real data acquisition parameters, including the source wavelet, source-receiver geometry, and survey configuration. The forward modeling results are subsequently processed in the inversion stage, where subsurface velocity models are iteratively updated to reduce discrepancies between observed and calculated data. Based on the inversion results, the process may be repeated iteratively to refine the subsurface model. The iterative nature of this workflow allows for progressive enhancements in model accuracy, facilitating high-resolution subsurface imaging for applications such as hydrocarbon exploration, geotechnical assessments, and seismic hazard evaluation.

Figure 2A:
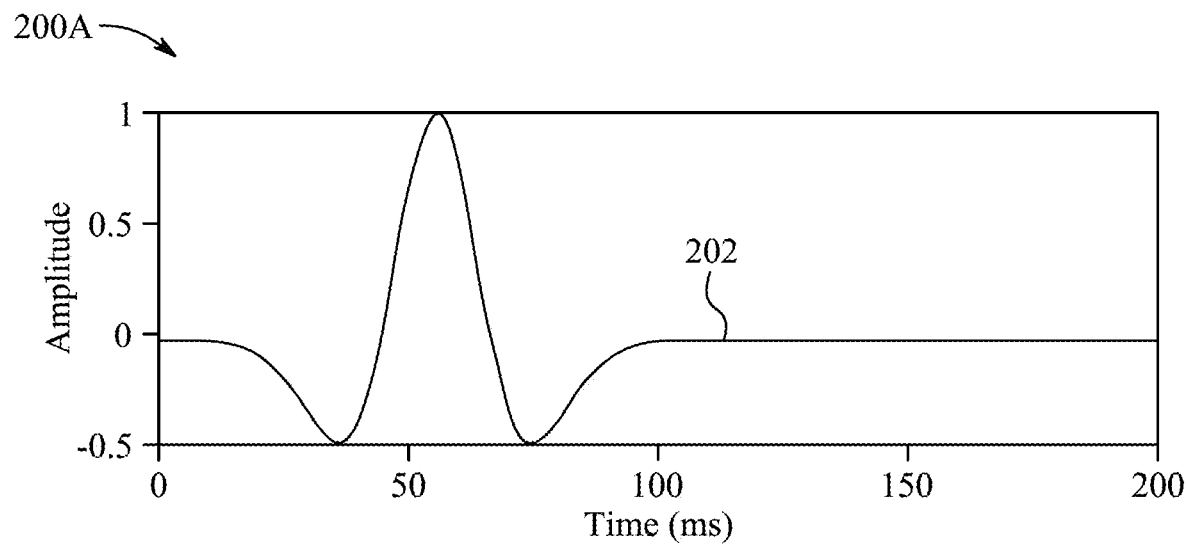
FIG. 2A is a schematic representation of a low-frequency wavelet, according to certain embodiments.
Figure 2B:
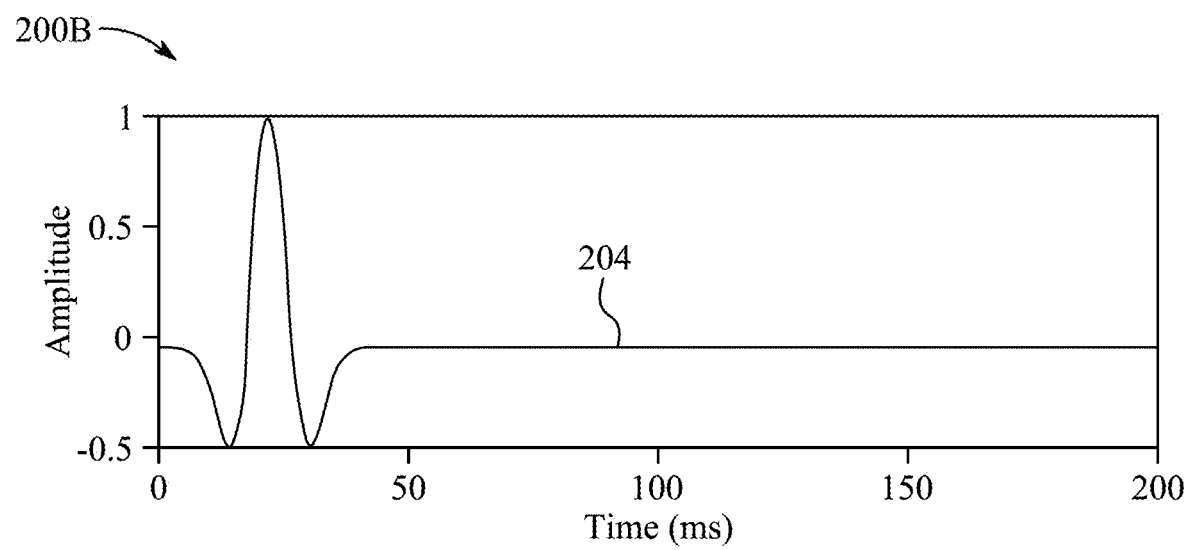
FIG. 2B is a schematic representation of a high-frequency wavelet, according to certain embodiments.

FIG. 2A depicts a low-frequency source wavelet 202 having a peak frequency of 20 Hz, while FIG. 2B illustrates a high-frequency source wavelet 204 having a peak frequency of 50 Hz. The wavelets (202, 204) are fundamental components in the process of seismic data modeling, particularly in the transformation of low-frequency seismic traces into high-frequency synthetic seismic data for enhanced subsurface imaging.

As depicted in FIG. 2A, the low-frequency wavelet 202 is injected into a subsurface region to generate common shot gathers (CSGs) containing seismic traces that primarily capture the long-wavelength components of subsurface reflectivity. The low-frequency dataset is used for seismic applications such as the FWI, where minimizing cycle-skipping effects is required for accurate velocity model updates. However, low-frequency wavelets inherently lack the fine-scale resolution required for detailed subsurface imaging, particularly in shallow geological formations.

FIG. 2B depicts the high-frequency wavelet 204, which is utilized to generate seismic traces exhibiting enhanced resolution of subsurface features. The high-frequency wavelet 204 is injected at a sparse set of shot locations to capture the higher-frequency components of the subsurface response. The dataset, while providing improved structural clarity, is computationally expensive to generate for all shot locations due to the increased wavefield complexity and the higher temporal and spatial sampling requirements, therefore only a sparse set of shot locations are utilized.

High-frequency seismic data provides greater detail and higher resolution of subsurface structures. The resolution of the final seismic image is determined by both the frequency of the seismic wave and the propagation velocity of the seismic wave. According to the Rayleigh resolution limit, the minimum detectable layer thickness in a seismic image is equal to one-quarter of the wavelength of the seismic wave. The wavelength is derived using the equation $\lambda=v/f$, where $\lambda$ represents the wavelength, v denotes the propagation velocity, and f corresponds to the frequency of the seismic wave.

For instance, when a seismic frequency of 20 Hz is utilized with a propagation velocity of 4000 m/s, the resulting wavelength is 200 meters, allowing the imaging of subsurface layers with a thickness of at least 50 meters. Conversely, when a seismic frequency of 50 Hz is used with the same propagation velocity, the wavelength is reduced to 80 meters, thereby enabling the imaging of layers as thin as 20 meters. The aforementioned principle demonstrates that high-frequency seismic data enhances resolution by enabling the detection of thinner geological features. Structural elements such as thin layers, localized anomalies, faults, fractures, and cavities, which may not be clearly distinguishable in low-resolution seismic images, become more discernible in high-resolution images derived from high-frequency seismic data. However, there are limitations in the acquisition of high-frequency seismic data.

To overcome the limitations associated with full high-frequency seismic data acquisition, a one-dimensional (1D) local matching filter is applied to transform low-frequency seismic traces into synthetic high-frequency traces. The 1D local matching filter is a signal processing technique that facilitates the interpolation of missing high-frequency content by estimating and applying a transformation function between the low-frequency wavelet 202 and the high-frequency wavelet 204 datasets.

Mathematically, the matching filter f(t) is computed in the time domain to solve the equation:

$$d^h(r, t|s) = d^l(r, t|s) * f(t) \tag{1}$$

where $d^h$(r, t|s) and $d^l$(r, t|s) denote the sparse high- and sparse low-frequency traces, respectively, s is the source location, and r is the receiver location, * denotes temporal convolution and f(t) is the required filter. Convolution is a fundamental mathematical operation used to enhance signal interpretation by combining two functions to create a third function. Convolution is performed by sliding one function over another, a process in which one function is systematically shifted relative to the other. At each shift position, the values of the overlapping functions are multiplied together, and the resulting products are summed to generate a new function. This computational method is particularly useful in seismic imaging, where it is applied to filter seismic traces, enhance resolution, and reconstruct subsurface velocity models.

In the frequency domain, equation (1) is given by, $$D^h(r|s) = D^l(r|s)F; \qquad (2)$$

where $D^h(r|s)$ and $D^l(r|s)$ represent the temporal Fourier transform of the sparse high- and sparse low-resolution traces, and F represents a 1D matching filter. The programming instructions stored in the memory include a Fourier transform, and the processor of the computing device 114 is configured to execute the Fourier transform to transform the sparse low frequency traces $d^l(r, t|s)$ in the time domain to sparse low frequency traces $D^l(r|s)$ in the frequency domain, and transform the sparse high frequency traces $d^h(r, t|s)$ in the time domain to sparse high frequency traces $D^h(r|s)$ in the frequency domain.

The 1D matching filter F is calculated in the frequency domain by:

$$F = \frac{D^h(r|s) \cdot D^l(r|s)}{[D^l(r|S)]^2 + \varepsilon} \qquad (3)$$

where $\varepsilon$ is a damping factor determining numerical stability.

The 1D matching filter F is computed using both the low-frequency traces and high-frequency traces. The computing device 114 then converts the traces of the sparse low frequency common receiver gather into simulated high frequency traces by convolving the 1D matching filter with the traces of the sparse low frequency common receiver gather. Initially, a size of a time window is selected, where the size of the time window is in a range of greater than or equal to three periods and less than or equal to five periods of the traces of the sparse low frequency common receiver gather. Once the time window is determined, the computing device convolves the 1D matching filter with the traces of the sparse low frequency common receiver gather within a three wavelength offset from the time window.

The time window is then shifted to an adjacent set of traces of the sparse low frequency common receiver gather, and the 1D matching filter is again convolved with the adjacent set of traces within a three wavelength offset from the time window. The shifting and convolution process is iteratively performed, where the time window is continuously shifted, and the 1D matching filter is convolved with the traces of the sparse low frequency common receiver gather until all of the traces of the sparse low frequency common receiver gather are converted into simulated high frequency traces.

In the frequency domain, the matching filter is obtained by dividing the high-frequency traces by the corresponding low-frequency traces. Once the matching filter is computed, it is applied to the low-frequency traces through multiplication in the frequency domain. Since multiplication in the frequency domain corresponds to convolution in the time domain, convolving the matching filter with the low-frequency traces results in the generation of high-frequency traces.

The accuracy of this transformation depends on the consistency of acquisition parameters between the low-frequency and high-frequency traces used to compute the matching filter. These parameters include the velocity model, source and receiver layout, sampling interval, and total recording time.

The calculated matching filter F is then applied to the entire set of low-frequency traces, effectively transforming them into high-frequency synthetic traces that closely resemble the true high-frequency dataset. Since the matching filter operates within a localized temporal and spatial window, the matching filter remains computationally efficient while preserving fine-scale details essential for high-resolution subsurface imaging.

The matching filter used in this work is a 1D local matching filter. It is computed within a small window of the input data and then applied to the corresponding window of the target (desired) data. The window is gradually shifted across the data, with the filter being recalculated and applied at each new position. This process continues until the entire dataset is covered.

The procedure can be summarized as follows:

1. Parameter Selection:
   The window parameters are selected based on the input data. The window size is defined as $n_{tr} \times n_{smp}$, where $n_{tr}$ is the number of traces (typically an odd number between 3 and 9), and $n_{smp}$ is the number of time samples (usually 3 to 5 times the dominant period length).
   The value of $\varepsilon$ is selected to stabilize the filter calculation, a typical value of $\varepsilon$ is equal to 0.1% to 0.3% of the maximum amplitude within the selected window.

2. Filter Estimation:
   The matching filter, which transforms the input data into the desired data, is estimated using Equation 3. This estimation is localized to the current window, where both $D^h(r|s)$ and $D^l(r|s)$ are limited to the selected subset.

3. Filter Application:
   The estimated filter is applied to the same window in the low-resolution data, converting it into high-resolution data within that segment.

4. Vertical Shifting:
   The window is then shifted vertically (along the time axis).

5. Iteration:
   A new filter is calculated for the updated window, and the process in Step 3 is repeated. Steps 4 and 5 are iterated until all time samples in the current set of traces are processed.

6. Horizontal Shifting:
   After the vertical direction is fully covered, the window is shifted horizontally to select a new set of traces.

7. Repeat Until Complete:
   The entire procedure (Steps 2-6) is repeated until the full seismic gather is processed.

The application of the local-matching filter is executed through a structured series of steps for optimal transformation of low-frequency seismic traces into high-frequency traces. At the first step, the time-domain window size is selected, with the window length set to at least three wave periods but not exceeding five wave periods. A preliminary evaluation is conducted using window lengths of three, four, and five periods, and the window length that provides the best results is selected for further processing. Subsequently, the spatial extent of the window along the offset direction is determined. While any number of traces may be selected, empirical analysis indicates that a window encompassing three traces produces optimal results in most scenarios.

Following the selection of window parameters, the initial matching filter is computed using the selected window dimensions, which consist of a time-domain window of three to five periods and an offset-direction window of three traces. The computed matching filter is then applied to all low-frequency traces within a three-wavelength offset from the designated window, allowing localized frequency transformation while maintaining spatial consistency.

Once the filter is applied, the processing window is shifted in the vertical direction along the seismic traces to enable progressive filtering across the entire dataset. This process is repeated iteratively until the entire length of the trace is processed, allowing the matching filter to be applied across all relevant seismic data. Upon reaching the terminal point of a given trace, the processing window is repositioned at the top of the next group of traces to facilitate the continued application of the matching filter. The iterative application of the filtering operations continues across all traces until the entirety of the low-frequency traces has been processed, generating enhanced high-frequency traces throughout the survey area.

Figure 3:
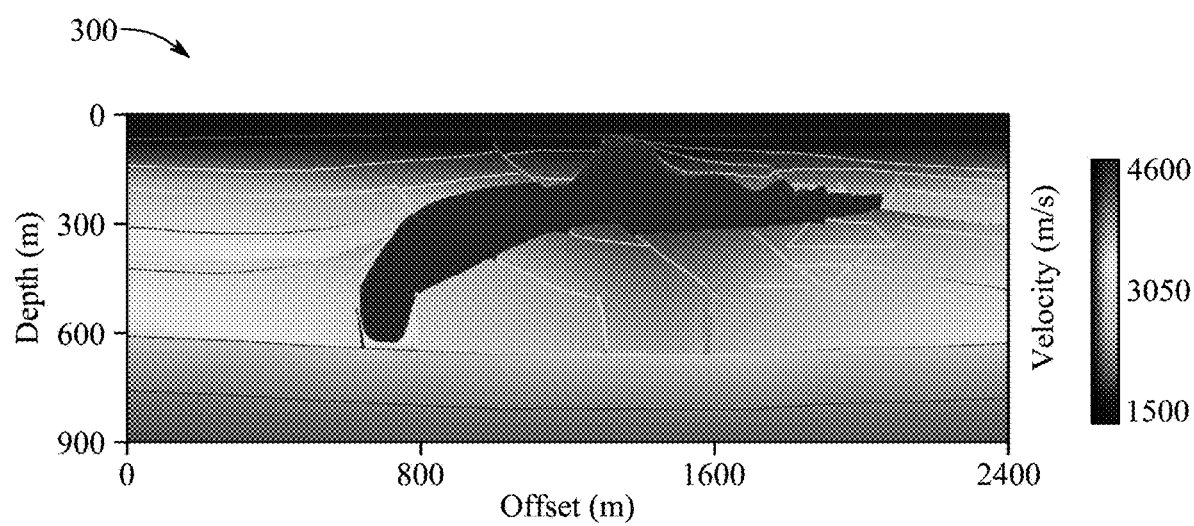
FIG. 3 is a schematic representation of a synthetic velocity model, according to certain embodiments.

FIG. 3 illustrates a synthetic velocity model 300 used to generate seismic data and evaluate the method of the present disclosure. The synthetic velocity model 300 represents a numerical approximation of the subsurface geological structure, where variations in seismic wave propagation velocity are defined based on stratigraphic and lithological characteristics. The synthetic velocity model 300 serves as a controlled testing environment for validating the effectiveness of the seismic data processing method of the present disclosure, in transforming low-frequency seismic traces into high-frequency synthetic seismic data.

The x-axis of the synthetic velocity model 300 represents the horizontal distance along the surface of the model, offset, measured in meters. The offset corresponds to the spatial distribution of both seismic sources and receivers, where seismic waves are generated and subsequently recorded across various lateral positions. The y-axis denotes depth, measured in meters, representing the vertical extent of the subsurface geological layers. The variation in velocity values within the synthetic velocity model is depicted through a color gradient, indicating different subsurface formations, including salt bodies, overthrust structures, and high-contrast velocity interfaces.

The synthetic velocity model 300 is based on the SEG/EAGE Salt and Overthrust synthetic model (referring to the Society of Exploration Geophysicists (SEG)/the European Association of Geoscientists and Engineers (EAGE) Salt and Overthrust synthetic model created by the SEG/EAGE 3-D Modeling committee chaired by University of Southern California, United States of America and Politecnico di Milano (a public, scientific-technological university in Milan, Italy) as part of a joint project). The synthetic velocity model 300 is designed to simulate complex subsurface conditions, including high-contrast velocity interfaces, salt bodies, and overthrust structures, which introduce challenges in seismic imaging. To generate synthetic seismic traces, a total of 240 shot gathers were placed along the surface of the synthetic velocity model 300, where each shot location was separated by a shot interval of 10 meters. The seismic traces were computed using a numerical solution to the acoustic wave equation, specifically employing a fourth-order finite-difference scheme in space and a second-order finite-difference scheme in time. Such computational method rendered accurate modeling of wave propagation behavior within the synthetic velocity model 300.

Each shot gather within the synthetic velocity model 300 consisted of 240 seismic traces, where the receivers were spaced at 10-meter intervals along the surface of the synthetic velocity model 300. The acquisition geometry was configured to simulate a realistic seismic survey, capturing both primary reflections and deeper wave interactions that contribute to subsurface imaging.

To assess the accuracy, two distinct seismic datasets were generated using the synthetic velocity model 300. The first dataset was derived using a low-frequency source wavelet with a peak frequency of 20 Hz, whereas the second dataset was generated using a high-frequency source wavelet with a peak frequency of 50 Hz. The first dataset, along with a sparsely sampled version of the second dataset, served as input for the seismic data transformation process, where low-frequency traces were computationally converted into high-frequency synthetic traces. The full high-frequency dataset (50 Hz) was retained as a reference dataset, enabling quality control (QC) and validation of the final seismic imaging results.

The synthetic velocity model 300 provided a well-defined framework for evaluating the efficacy of the method of the present disclosure using 1D local matching filter. By applying the transformation process to the synthetic data generated the synthetic velocity model 300, ability of the synthetic velocity model 300 to interpolate high-frequency seismic content and enhance subsurface resolution was rigorously tested. The presence of complex geological features within the synthetic velocity model 300, including salt structures, fault zones, and stratigraphic discontinuities, ensured that the method of the present disclosure is capable of handling realistic subsurface challenges.

Figure 4A:
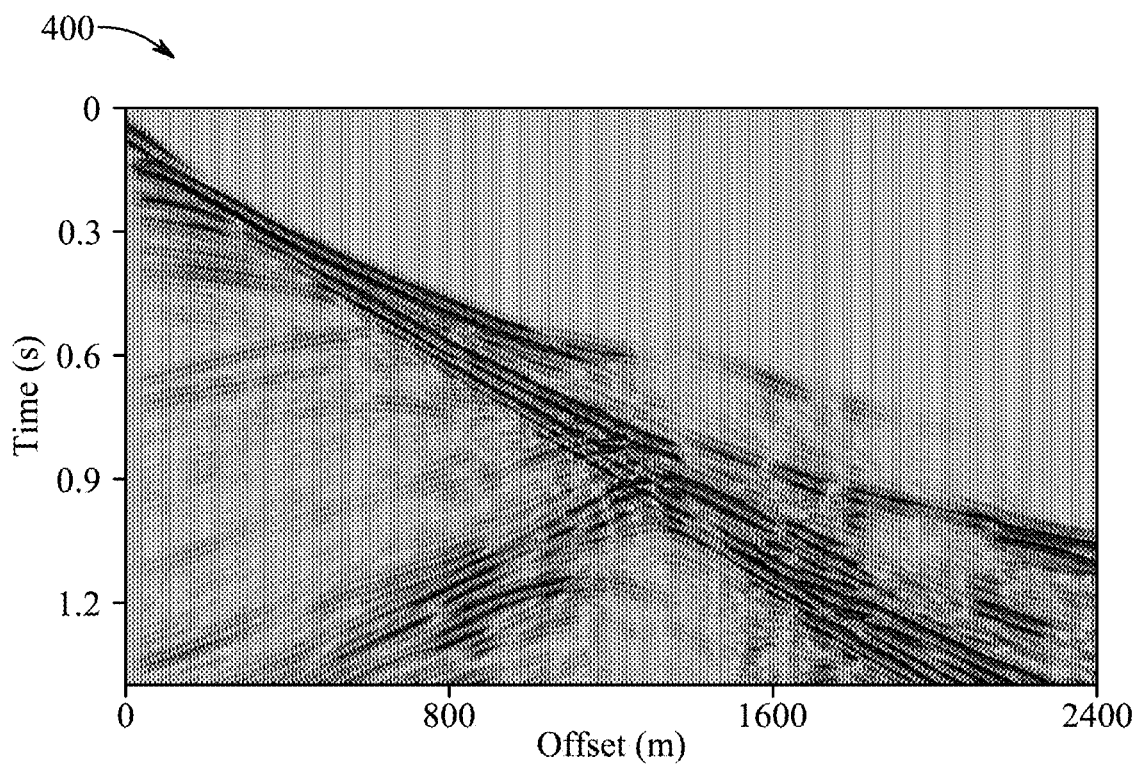
FIG. 4A is a schematic representation of a low-frequency common receiver gather, according to certain embodiments.

In FIG. 4A, a low-frequency common receiver gather (CRG) 400 is shown, which includes 240 traces recorded at a frequency of 20 Hz. This dataset is generated as part of the initial seismic survey and represents the full set of low-frequency traces acquired at the receiver locations. The x-represents offset in meters, while the y-axis represents time in seconds, illustrating the arrival times of seismic wave reflections. This dataset is an input to the method of FIG. 1A, as it provides the structural information necessary for generating synthetic high-frequency traces.

Figure 4B:
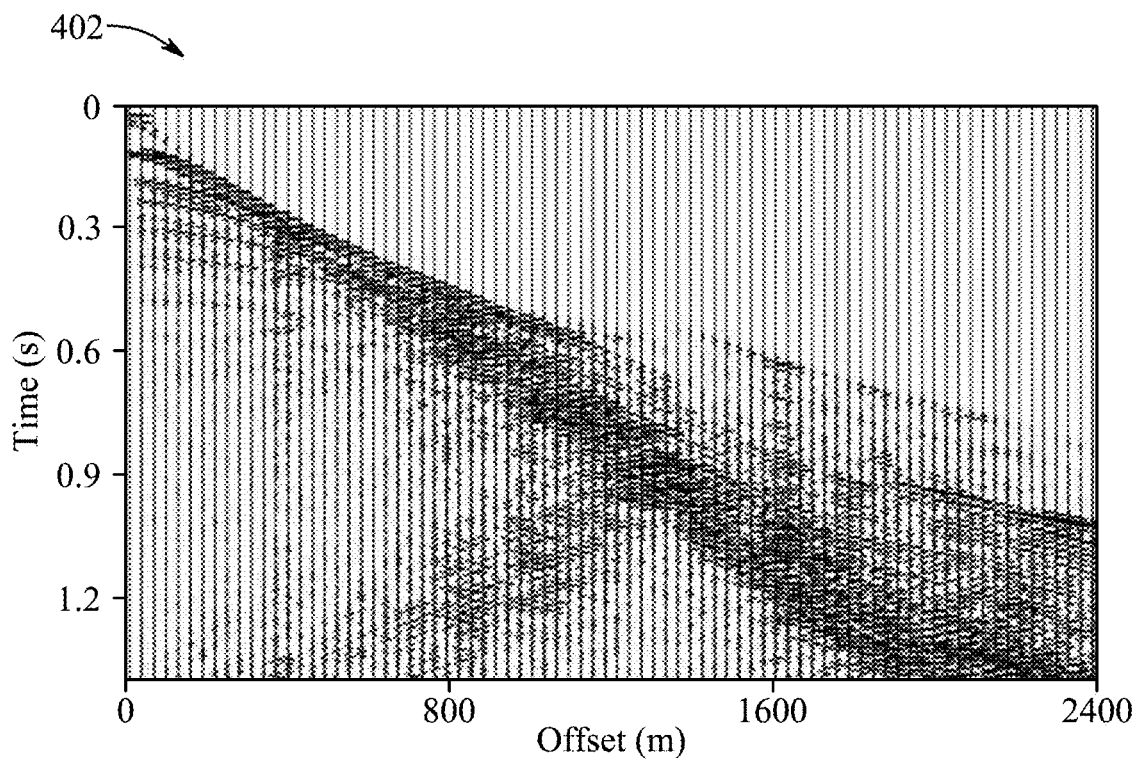
FIG. 4B is a schematic representation of a sparse high-frequency common receiver gather, according to certain embodiments.

FIG. 4B illustrates a sparse high-frequency CRG 402. A sparse number of the seismic traces generated from the reflected waves due to the high frequency seismic shot is about 80 seismic traces recorded at a frequency of 50 Hz. This dataset is obtained by selecting every third trace from the full high-frequency data, resulting in a trace interval of 30 meters instead of the original 10-meter spacing used in FIG. 4A. The x-axis offset, while the y-axis represents time in seconds. The sparse nature of this dataset poses a challenge for high-resolution imaging, as high-frequency information is missing between receiver locations.

Figure 5A:
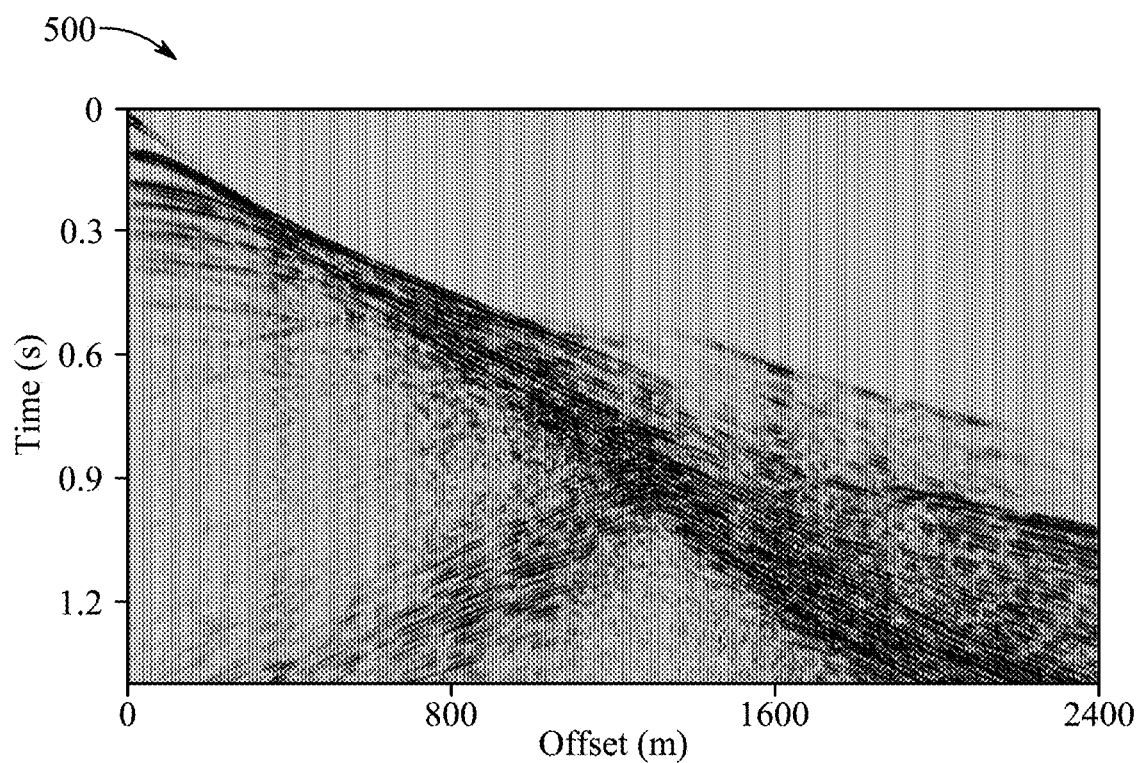
FIG. 5A is a schematic representation of a true high-frequency common receiver gather, according to certain embodiments.

FIG. 5A presents the true high-frequency CRG 500. The full number of the seismic traces generated from the reflected waves due to the low frequency seismic shot is about 240 seismic traces recorded at a frequency of 50 Hz and serves as the reference dataset for quality control (QC). This dataset is generated by solving the acoustic wave equation, ensuring that it accurately represents the expected high-frequency response of the subsurface. The x-axis represents the offset, while the y-axis represents time in seconds. The dataset serves as a benchmark for evaluating the accuracy of the high-frequency traces generated using the method of the present disclosure.

Figure 5B:
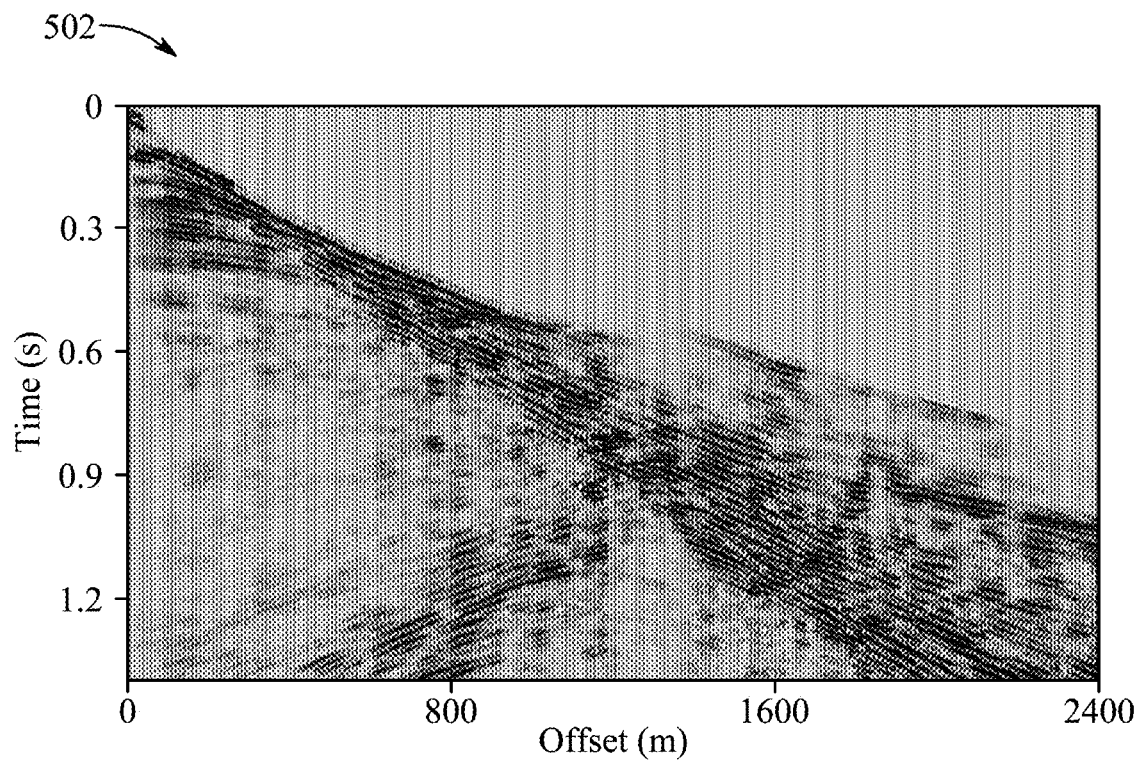
FIG. 5B is a schematic representation of an enhanced high-frequency common receiver gather, according to certain embodiments.

FIG. 5B illustrates the enhanced high-frequency CRG 502, which is obtained by applying the 1D local matching filter to the low-frequency traces from FIG. 4A and transforming the low-frequency traces into high-frequency equivalents. The method of FIG. 1A utilizes the matching filter F to transform the sparse high-frequency traces from FIG. 4B into a version that matches the reference dataset in FIG. 5A. The transformation is achieved so that the synthetic high-frequency traces retain the structural characteristics and amplitude distribution of true high-frequency data. The x-axis represents the offset, while the y-axis represents time in seconds, consistent with the previous CRGs.

Various aspects of enhancing seismic data resolution by transforming low-frequency seismic data to high-frequency seismic data are described in FIG. 1 to FIG. 5B.

In an exemplary embodiment, a method for generating synthetic high frequency seismic data is described. The method includes injecting, by a seismic source, a first seismic shot having a low frequency into a surface region under investigation, receiving, by a plurality of seismic receivers, a plurality of waves reflected from geological interfaces below the surface region due to the first seismic shot, generating, by each of the plurality of seismic receivers, seismic traces from the reflected waves due to the first seismic shot, recording, by a recorder operatively connected to each of the plurality of seismic receivers, the seismic traces of the first seismic shot, injecting, by the seismic source, a second seismic shot having a high frequency into the surface region under investigation, receiving, by the plurality of seismic receivers, a sparse number of the reflected waves due to the second seismic shot, generating, by each of the plurality of seismic receivers, a sparse number of seismic traces from the sparse number of reflected waves due to the second seismic shot, recording, by the recorder, the sparse number of seismic traces of the second seismic shot, and receiving, by a computing device operably connected to the recorder, where the computing device includes a communications unit, electrical circuitry, a memory having program instructions and at least one processor configured to execute the program instructions, the seismic traces of the first seismic shot and the sparse number of seismic traces of the second seismic shot. The computing device is configured for combining, by the computing device, the seismic traces of the reflected waves due to the first seismic shot into a low frequency seismic shot gather, combining, by the computing device, the sparse number of seismic traces of the second seismic shot into a sparse high frequency common receiver gather, generating, by the computing device, a sparse low frequency common receiver gather by resampling the low frequency common receiver gather to match a number of samples per seismic trace of the low frequency common receiver gather to a number of samples per seismic trace of the sparse high frequency common receiver gather, calculating, by the computing device, a 1D local matching filter, generating, by the computing device, a dataset of simulated high frequency traces by converting the traces of the sparse low frequency common receiver gather into high frequency traces by applying the 1D local matching filter to the traces of the sparse low frequency common receiver gather, and generating, by the computing device, a high-resolution subsurface image of the geological interfaces below the surface region from the dataset of simulated high frequency traces.

In an aspect, the high-resolution subsurface image is used to determine whether fault lines were generated by an earthquake in the assessment of a geological region for residential or commercial construction. The time saved during the geological survey by the methods of the present disclosure translate into real savings survey costs and provide quick resolution in determining if the geological area can safely support a building.

In another aspect, the high-resolution subsurface image is used to determine whether the geological subsurface region is structurally suitable for hydrocarbon drilling or fracturing.

In another aspect, the high-resolution subsurface image is used to determine whether an existing geological subsurface region which has undergone fracturing is structurally stable.

The low frequency seismic shot is injected at a frequency of about 20 Hz and the high frequency seismic shot is injected at a frequency of about 50 Hz.

The 1D matching filter is calculated in a time domain based on:

$$d^h(r, t|s) = d^l(r, t|s) * f(t),$$

where $d^h(r,t|s)$ represents the traces of the sparse high frequency common receiver gather in a time domain, $d^l(r,t|s)$ represents the traces of the sparse low frequency common receiver gather in the time domain, s is a location of the seismic source, r is a location of an $r^{th}$ seismic receiver, * represents temporal convolution and f(t) is the 1D matching filter.

In an aspect, the method includes performing a Fourier transform on the traces of the sparse low frequency common receiver gather to transform the sparse low frequency traces $d^l(r,t|s)$ in the time domain to sparse low frequency traces $D^l(r,t|s)$ in the frequency domain; and performing a Fourier transform on the sparse high frequency common receiver gather to transform the sparse high frequency traces $d^h(r,t|s)$ in the time domain to sparse high frequency traces $D^l(r|s)$ in the frequency domain.

The method includes calculating, by the computing device, the 1D matching filter F in the frequency domain by:

$$F = \frac{D^h(r|S) \cdot D^l(r|s)}{[D^l(r|S)]^2 + \varepsilon}$$

where ε is a damping factor.

The method includes converting, by the computing device, the traces of the sparse low frequency common receiver gather into simulated high frequency traces by convolving the 1D matching filter with the traces of the sparse low frequency common receiver gather.

The method includes converting the traces of the sparse low frequency common receiver gather by selecting a size of a time window, where the size of the time window is in a range of greater than or equal to three periods and less than or equal to five periods of the traces of the sparse low frequency common receiver gather, convolving the 1D matching filter with the traces of the sparse low frequency common receiver gather within a three wavelength offset from the time window, shifting the time window to an adjacent set of traces of the sparse low frequency common receiver gather, convolving the 1D matching filter with the adjacent set of traces within a three wavelength offset from the time window, and continuing to shift the time window and convolve the 1D matching filter with the traces of the sparse low frequency common receiver gather until all of the traces of the sparse low frequency common receiver gather are converted into simulated high frequency traces.

The method includes receiving the plurality of waves reflected from geological interfaces below the surface region due to the first seismic shot by the plurality of seismic receivers, where a density of the plurality of seismic receivers is in a range of about three seismic receivers per meters squared to about three seismic receivers per 25 meters squared.

The method includes identifying, by the computing device, one or more of a thin layer, a local anomaly, a fault, a fracture, and a cavity in the geological interfaces below the surface region from the high-resolution subsurface image generated from the dataset of simulated high frequency traces.

In another exemplary embodiment, a system for generating a high-resolution subsurface image of geological interfaces below a surface region from simulated high frequency traces is described. The system comprising a seismic source located on the surface region, wherein the seismic source is configured to inject one or more of a low frequency seismic shot and a high frequency seismic shot into a subsurface region below the surface region, a plurality of seismic receivers located on the surface region, wherein the plurality of seismic receivers are configured to generate seismic traces from waves reflected from the geological interfaces, at least one recorder connected to the plurality of seismic receivers, wherein the at least one recorder is configured to receive and store a full number of the seismic traces generated from the reflected waves due to the low frequency seismic shot and a sparse number of the seismic traces generated from the reflected waves due to the high frequency seismic shot, and a computing device operably connected to the recorder, wherein the computing device includes a communications unit, electrical circuitry, a memory having program instructions and at least one processor configured to execute the program instructions. The computing device is configured to combine the seismic traces of the reflected waves due to the first seismic shot into a low frequency seismic shot gather, combine the sparse number of seismic traces of the second seismic shot into a sparse high frequency common receiver gather, generate a sparse low frequency common receiver gather by resampling the low frequency common receiver gather to match a number of samples per seismic trace of the low frequency common receiver gather to a number of samples per seismic trace of the sparse high frequency common receiver gather, calculate a 1D local matching filter, generate a dataset of simulated high frequency traces by a conversion of the traces of the sparse low frequency common receiver gather into high frequency traces by an application of the 1D local matching filter to the traces of the sparse low frequency common receiver gather, and generate a high-resolution subsurface image of the geological interfaces below the surface region from the dataset of simulated high frequency traces.

The low frequency seismic shot is injected at a frequency of about 20 Hz and the high frequency seismic shot is injected at a frequency of about 50 Hz.

The plurality of seismic receivers are spaced from the seismic source and each other by a distance in a range of one meter to ten meters.

The full number of the seismic traces generated from the reflected waves due to the low frequency seismic shot is about 240 seismic traces and the sparse number of the seismic traces generated from the reflected waves due to the high frequency seismic shot is about 80 seismic traces.

The computing device is further configured to calculate the 1D matching filter is calculated in a time domain based on:

$$d^h(r, t|s) = d^l(r, t|s) * f(t),$$

where $d^h(r,t|s)$ represents the traces of the sparse high frequency common receiver gather in a time domain, $d^l(r,t|s)$ represents the traces of the sparse low frequency common receiver gather in the time domain, s is a location of the seismic source, r is a location of an $r^{th}$ seismic receiver, * represents temporal convolution and f(t) is the 1D matching filter.

The program instructions include a Fourier transform, and the processor is configured to execute the Fourier transform to transform the sparse low frequency traces $d^l(r,t|s)$ in the time domain to sparse low frequency traces $D^l(r,t|s)$ in the frequency domain, and transform the sparse high frequency traces $d^h(r,t|s)$ in the time domain to sparse high frequency traces $D^l(r|s)$ in the frequency domain.

The computing device is further configured to calculate the 1D matching filter F in the frequency domain by:

$$F = \frac{D^h(r|S) \cdot D^l(r|s)}{[D^l(r|S)]^2 + \varepsilon}$$

where $\varepsilon$ is a damping factor.

The computing device is further configured to convert the traces of the sparse low frequency common receiver gather into simulated high frequency traces by a convolution of the 1D matching filter with the traces of the sparse low frequency common receiver gather.

The computing device is further configured to convert the traces of the sparse low frequency common receiver gather by a selection of a size of a time window, wherein the size of the time window is in a range of greater than or equal to three periods and less than or equal to five periods of the traces of the sparse low frequency common receiver gather, convolve the 1D matching filter with the traces of the sparse low frequency common receiver gather within a three wavelength offset from the time window, shift the time window to an adjacent set of traces of the sparse low frequency common receiver gather, convolve the 1D matching filter with the adjacent set of traces within a three wavelength offset from the time window, and continue to shift the time window and convolve the 1D matching filter with the traces of the sparse low frequency common receiver gather until all of the traces of the sparse low frequency common receiver gather are converted into simulated high frequency traces.

In an aspect, a density of the plurality of seismic receivers is in a range of about three seismic receivers per meters squared to about three seismic receivers per 25 meters squared.

The computing device is further configured to identify one or more of a thin layer, a local anomaly, a fault, a fracture, and a cavity in the geological interfaces below the surface region from the high-resolution subsurface image generated from the dataset of simulated high frequency traces.

Figure 6:
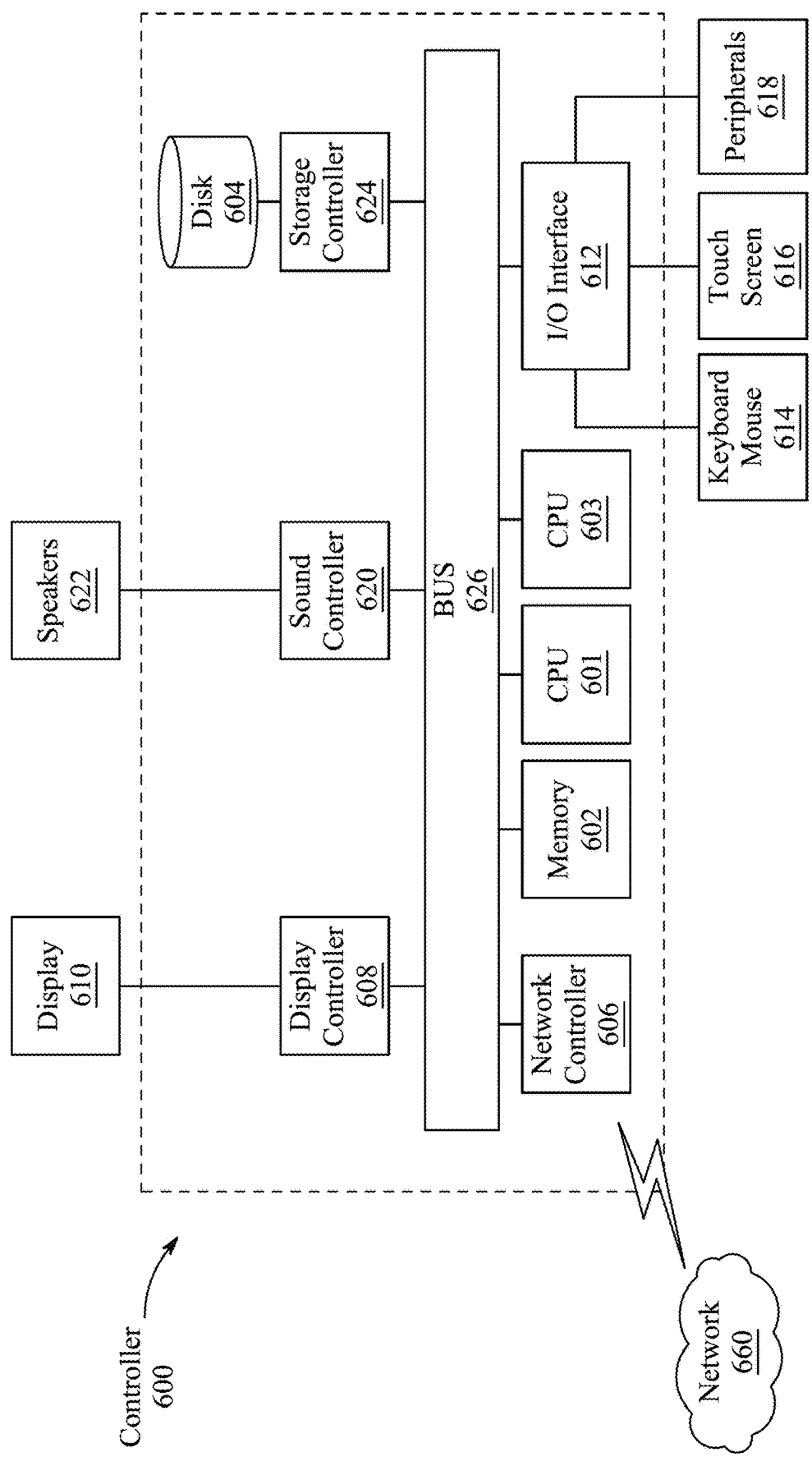
FIG. 6 is an illustration of a non-limiting example of details of computing hardware used in the computing system, according to certain embodiments.

Next, further details of the hardware description of the computing environment according to exemplary embodiments is described with reference to FIG. 6. In FIG. 6, a controller 600 is described as representative of the computing device 114 of FIG. 1 which includes a CPU 601, which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN subnetworks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
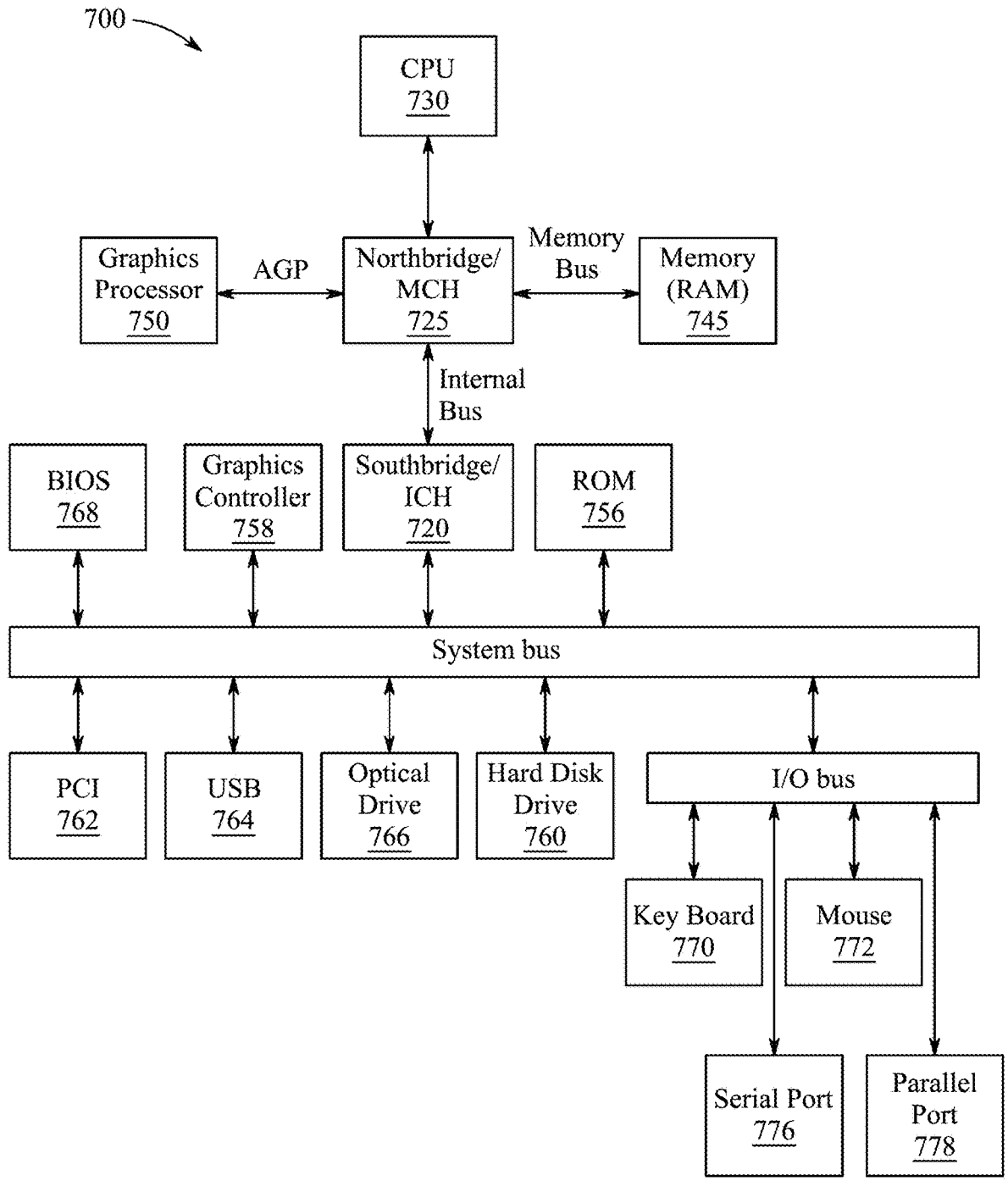
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
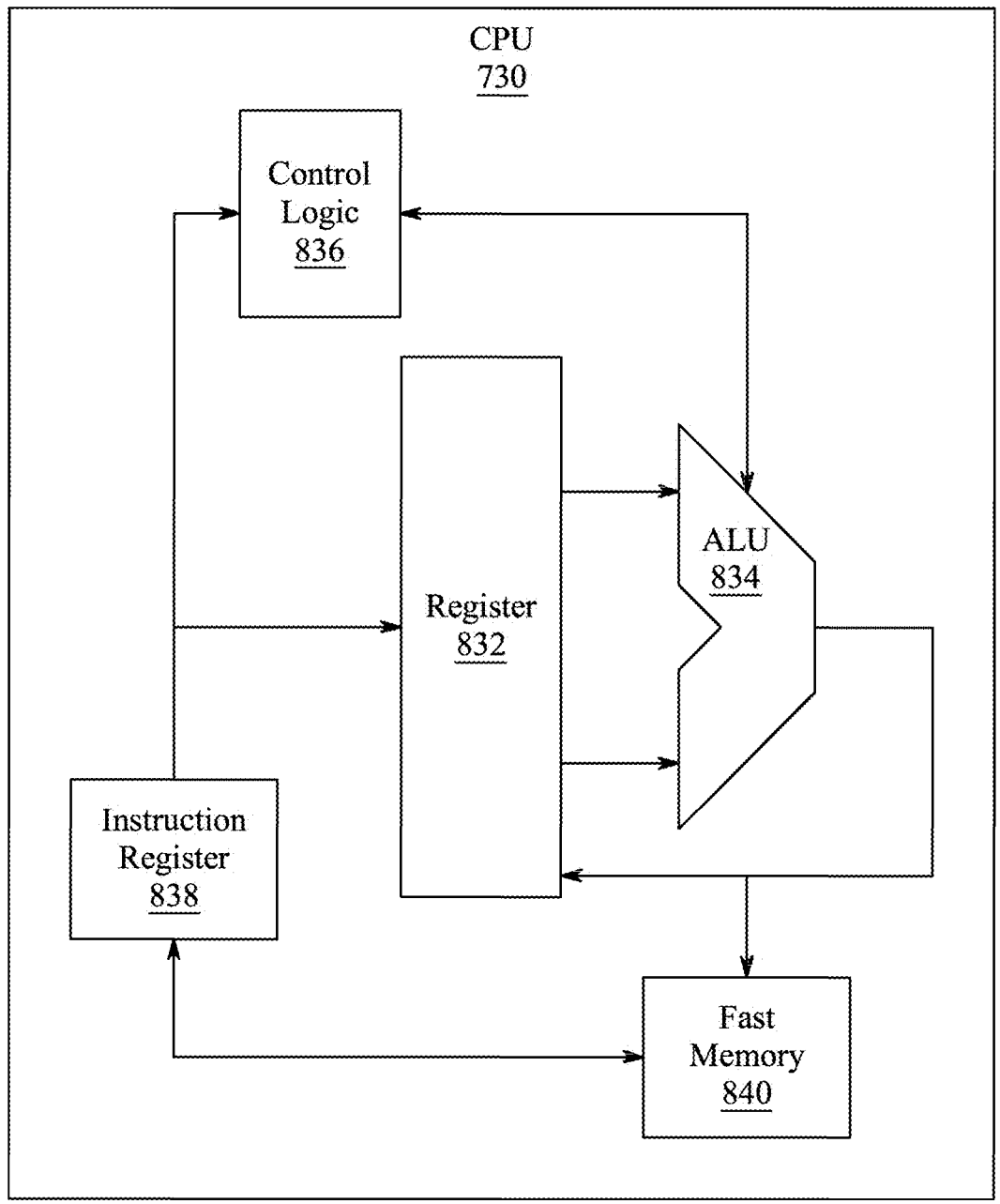
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions is fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
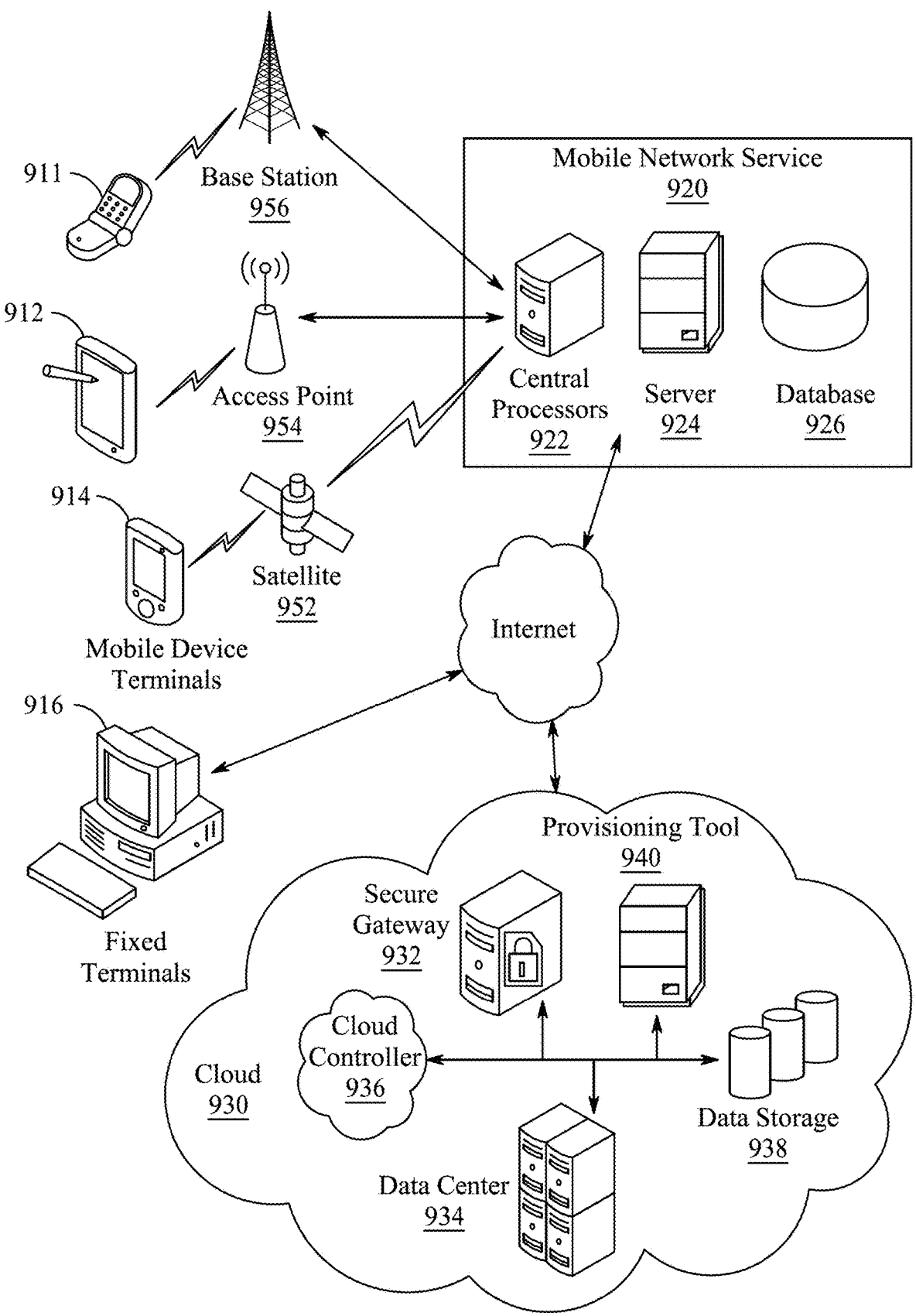
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 930 including a cloud controller 936, a secure gateway 932, a data center 934, data storage 938 and a provisioning tool 940, and mobile network services 920 including central processors 922, a server 924 and a database 926, which may share processing, as shown by FIG. 9, in addition to various human interface and communication devices (e.g., display monitors 916, smart phones 99, tablets 912, personal digital assistants (PDAs) 914). The network may be a private network, such as a LAN, satellite 952 or WAN 954, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for generating synthetic high frequency seismic data, comprising:
   injecting, by a seismic source, a first seismic shot having a low frequency into a surface region under investigation;
   receiving, by a plurality of seismic receivers, a plurality of waves reflected from geological interfaces below the surface region due to the first seismic shot;
   generating, by each of the plurality of seismic receivers, seismic traces from the reflected waves due to the first seismic shot;
   recording, by a recorder operatively connected to each of the plurality of seismic receivers, the seismic traces of the first seismic shot;
   injecting, by the seismic source, a second seismic shot having a high frequency into the surface region under investigation;
   receiving, by the plurality of seismic receivers, a sparse number of the reflected waves due to the second seismic shot;
   generating, by each of the plurality of seismic receivers, a sparse number of seismic traces from the sparse number of reflected waves due to the second seismic shot;
   recording, by the recorder, the sparse number of seismic traces of the second seismic shot;
   receiving, by a computing device operably connected to the recorder, wherein the computing device includes a communications unit, electrical circuitry, a memory having program instructions and at least one processor configured to execute the program instructions, the seismic traces of the first seismic shot and the sparse number of seismic traces of the second seismic shot, wherein executing, by the processor, the program instructions includes performing steps of:
      combining the seismic traces of the reflected waves due to the first seismic shot into a low frequency seismic shot gather;
      combining the sparse number of seismic traces of the second seismic shot into a sparse high frequency common receiver gather;
      generating a sparse low frequency common receiver gather by resampling the low frequency common receiver gather to match a number of samples per seismic trace of the low frequency common receiver gather to a number of samples per seismic trace of the sparse high frequency common receiver gather;
      calculating a 1D local matching filter;
      generating a dataset of simulated high frequency traces by converting the traces of the sparse low frequency common receiver gather into high frequency traces by applying the 1D local matching filter to the traces of the sparse low frequency common receiver gather; and
   generating, on a display connected to the computing device, a high-resolution subsurface image of the geological interfaces below the surface region from the dataset of simulated high frequency traces.

2. The method of claim 1, further comprising: injecting the low frequency seismic shot at a frequency of about 20 Hz and injecting the high frequency seismic shot at a frequency of about 50 Hz.

3. The method of claim 1, further comprising calculating the 1D matching filter in a time domain based on:

$$d^{h_1}(r, t|s) = d^l(r, t|s) * f(t),$$

where $d^h(r,t|s)$ represents the traces of the sparse high frequency common receiver gather in a time domain t, $d^l(r,t|s)$ represents the traces of the sparse low frequency common receiver gather in the time domain t, s is a location of the seismic source, r is a location of an $r^{th}$ seismic receiver, * represents temporal convolution and f(t) is the 1D matching filter.

4. The method of claim 3, further comprising:
performing a Fourier transform on the traces of the sparse low frequency common receiver gather to transform the sparse low frequency traces $d^l(r,t|s)$ in the time domain to sparse low frequency traces $D^l(r|s)$ in the frequency domain; and performing a Fourier transform on the sparse high frequency common receiver gather to transform the sparse high frequency traces $d^h(r,t|s)$ in the time domain to sparse high frequency traces $D^h(r|s)$ in the frequency domain.

5. The method of claim 4, further comprising:

calculating, by the computing device, the 1D matching filter F in the frequency domain by:

$$F = \frac{D^h(r|s) \cdot D^l(r|s)}{\left[D^l(r|s)\right]^2 + \varepsilon}$$

where $\varepsilon$ is a damping factor selected to stabilize the calculation of the 1D matching filter F to a value in a range of 0.1% to 0.3% of a maximum amplitude within a time window.

6. The method of claim 5, further comprising:

converting, by the computing device, the traces of the sparse low frequency common receiver gather into simulated high frequency traces by convolving the 1D matching filter with the traces of the sparse low frequency common receiver gather.

7. The method of claim 6, further comprising:

converting the traces of the sparse low frequency common receiver gather by selecting a size of the time window, wherein the size of the time window is in a range of greater than or equal to three periods and less than or equal to five periods of the traces of the sparse low frequency common receiver gather;

convolving the 1D matching filter with the traces of the sparse low frequency common receiver gather within a three wavelength offset from the time window;

shifting the time window to an adjacent set of traces of the sparse low frequency common receiver gather;

convolving the 1D matching filter with the adjacent set of traces within a three wavelength offset from the time window; and continuing to shift the time window and convolve the 1D matching filter with the traces of the sparse low frequency common receiver gather until all of the traces of the sparse low frequency common receiver gather are converted into simulated high frequency traces.

8. The method of claim 1, further comprising:

receiving the plurality of waves reflected from geological interfaces below the surface region due to the first seismic shot by the plurality of seismic receivers, wherein a density of the plurality of seismic receivers is in a range of about three seismic receivers per meters squared to about three seismic receivers per 25 meters squared.

9. The method of claim 1, further comprising:

identifying, by the computing device, one or more of a thin layer, a local anomaly, a fault, a fracture, and a cavity in the geological interfaces below the surface region from the high-resolution subsurface image generated from the dataset of simulated high frequency traces.

10. A system for generating a high-resolution subsurface image of geological interfaces below a surface region from simulated high frequency traces, comprising:

a seismic source located on the surface region, wherein the seismic source is configured to inject one or more of a low frequency seismic shot and a high frequency seismic shot into a subsurface region below the surface region;

a plurality of seismic receivers located on the surface region, wherein the plurality of seismic receivers are configured to generate seismic traces from waves reflected from the geological interfaces:

at least one recorder connected to the plurality of seismic receivers, wherein the at least one recorder is configured to receive and store a full number of the seismic traces generated from the reflected waves due to the low frequency seismic shot and a sparse number of the seismic traces generated from the reflected waves due to the high frequency seismic shot;

a display:

a computing device operably connected to the display and the at least one recorder, wherein the computing device includes a communications unit, electrical circuitry, a memory having program instructions and at least one processor configured to execute the program instructions to:

combine the seismic traces of the reflected waves due to the first seismic shot into a low frequency seismic shot gather;

combine the sparse number of seismic traces of the second seismic shot into a sparse high frequency common receiver gather;

generate a sparse low frequency common receiver gather by resampling the low frequency common receiver gather to match a number of samples per seismic trace of the low frequency common receiver gather to a number of samples per seismic trace of the sparse high frequency common receiver gather;

calculate a 1D local matching filter;

generate a dataset of simulated high frequency traces by a conversion of the traces of the sparse low frequency common receiver gather into high frequency traces by an application of the 1D local matching filter to the traces of the sparse low frequency common receiver gather;

generate a high-resolution subsurface image of the geological interfaces below the surface region from the dataset of simulated high frequency traces; and display the high-resolution subsurface image on the display.

11. The system of claim 10, wherein the low frequency seismic shot is injected at a frequency of about 20 Hz and the high frequency seismic shot is injected at a frequency of about 50 Hz.

12. The system of claim 10, wherein the plurality of seismic receivers are spaced from the seismic source and each other by a distance in a range of one meter to ten meters.

13. The system of claim 10, wherein the full number of the seismic traces generated from the reflected waves due to the low frequency seismic shot is about 240 seismic traces and the sparse number of the seismic traces generated from the reflected waves due to the high frequency seismic shot is about 80 seismic traces.

14. The system of claim 10, wherein the computing device is further configured to calculate the 1D matching filter is calculated in a time domain based on:

$$d^h(r, t|s) = d^l(r, t|s) * f(t),$$

where $d^h(r,t|s)$ represents the traces of the sparse high frequency common receiver gather in a time domain t, $d^l(r,t|s)$ represents the tracs of the sparse low frequency common receiver gather in the time domain t, s is a location of the seismic source, r is a location of an $r^{th}$ seismic receiver, * represents temporal convolution and f(t) is the 1D matching filter.

15. The system of claim 14, wherein the program instructions include a Fourier transform, and the processor is configured to execute the Fourier transform to:
transform the sparse low frequency traces $d^l(r,t|s)$ in the time domain to sparse low frequency traces $D^l(r|s)$ in the frequency domain; and
transform the sparse high frequency traces $d^h(r,t|s)$ in the time domain to sparse high frequency traces $D^h(r|s)$ in the frequency domain.

16. The system of claim 15, wherein the computing device is further configured to calculate the 1D matching filter F in the frequency domain by:

$$F = \frac{D^h(r|s) \cdot D^l(r|s)}{[D^l(r|s)]^2 + \varepsilon}$$

where $\varepsilon$ is a damping factor selected to stabilize the calculation of the 1D matching filter F to a value in a range of 0.1% to 0.3% of a maximum amplitude within a time window.

17. The system of claim 16, wherein the computing device is further configured to convert the traces of the sparse low frequency common receiver gather into simulated high frequency traces by a convolution of the 1D matching filter with the traces of the sparse low frequency common receiver gather.

18. The system of claim 17, wherein the computing device is further configured to:
convert the traces of the sparse low frequency common receiver gather by a selection of a size of the time window, wherein the size of the time window is in a range of greater than or equal to three periods and less than or equal to five periods of the traces of the sparse low frequency common receiver gather;
convolve the 1D matching filter with the traces of the sparse low frequency common receiver gather within a three wavelength offset from the time window;
shift the time window to an adjacent set of traces of the sparse low frequency common receiver gather;
convolve the 1D matching filter with the adjacent set of traces within a three wavelength offset from the time window; and
continue to shift the time window and convolve the 1D matching filter with the traces of the sparse low frequency common receiver gather until all of the traces of the sparse low frequency common receiver gather are converted into simulated high frequency traces.

19. The system of claim 10, wherein a density of the plurality of seismic receivers is in a range of about three seismic receivers per meters squared to about three seismic receivers per 25 meters squared.

20. The system of claim 10, wherein the computing device is further configured to identify one or more of a thin layer, a local anomaly, a fault, a fracture, and a cavity in the geological interfaces below the surface region from the high-resolution subsurface image generated from the dataset of simulated high frequency traces.

* * * * *